United States Patent
Kamei et al.

(10) Patent No.: US 7,546,325 B2
(45) Date of Patent: Jun. 9, 2009

(54) BACKUP SYSTEM, FILE SERVER AND BACKUP METHOD

(75) Inventors: Hitoshi Kamei, Sagamihara (JP); Yoji Nakatani, Yokohama (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 210 days.

(21) Appl. No.: 11/373,104

(22) Filed: Mar. 13, 2006

(65) Prior Publication Data

US 2007/0179999 A1    Aug. 2, 2007

(30) Foreign Application Priority Data

Jan. 27, 2006  (JP) .............................. 2006-018731

(51) Int. Cl.
  *G06F 12/00* (2006.01)
  *G06F 13/00* (2006.01)
(52) U.S. Cl. .......................... 707/204; 711/162; 714/13
(58) Field of Classification Search ........................ None
  See application file for complete search history.

(56) References Cited

U.S. PATENT DOCUMENTS

| | | | | |
|---|---|---|---|---|
| 5,761,415 A | * | 6/1998 | Joseph et al. | 709/200 |
| 5,875,296 A | * | 2/1999 | Shi et al. | 726/5 |
| 6,026,414 A | * | 2/2000 | Anglin | 707/204 |
| 6,175,878 B1 | * | 1/2001 | Seaman et al. | 719/315 |
| 6,260,069 B1 | * | 7/2001 | Anglin | 709/229 |
| 6,671,773 B2 | | 12/2003 | Kazar et al. | |
| 6,985,956 B2 | * | 1/2006 | Luke et al. | 709/229 |
| 7,089,293 B2 | * | 8/2006 | Grosner et al. | 709/217 |
| 7,127,479 B2 | * | 10/2006 | Tsaur et al. | 707/204 |

OTHER PUBLICATIONS

Skardal, Harald, et al., "Network Data Management Protocol Version 4", Network Working Group, Applications, Apr. 2003, pp. 1-5 and 13.

* cited by examiner

*Primary Examiner*—Greta L Robinson
*Assistant Examiner*—James J Wilcox
(74) *Attorney, Agent, or Firm*—Reed Smith LLP; Juan Carlos A. Marquez, Esq.

(57) ABSTRACT

When any file sharing server among a plurality of file sharing servers configuring a virtual file system receives a backup requests from a backup server, the file sharing server that received the backup request searches a file sharing server managing the files to be backed up among the plurality of file sharing servers, and transfers the backup request to the searched file sharing server. The file sharing server that received the transfer of the backup request transfers the backup data to the media server via a connection server.

5 Claims, 18 Drawing Sheets

FIG.4

| DATA | GNS BACKUP PATH | SERVER |
|---|---|---|
| 2005/11/12 | /aaa.file | NAS1 |
| 2005/11/19 | /dir1/ | NAS1 |
| ⋮ | ⋮ | ⋮ |

1111 → table; columns labeled 2001, 2002, 2003

FIG.5

| GNS PATH | SERVER | LOCAL PATH |
|---|---|---|
| /aaa.file | NAS1 | /mnt/fs1/aaa.file |
| /dir1/aaa | NAS2 | /mnt/fs2/aaa |
| /dir1/test.txt | NAS3 | /mnt/fs3/text.file |
| ⋮ | ⋮ | ⋮ |

1604 → table; columns labeled 2011, 2012, 2013

FIG.6

| CONNECTION SERVER ADDRESS |
|---|
| 192.168.10.100 |

1210 → table; field labeled 2020

BACKUP SYSTEM, FILE SERVER AND BACKUP METHOD

CROSS-REFERENCES TO RELATED APPLICATIONS

This application relates to and claims priority from Japanese Patent Application No. 2006-18731, filed on Jan. 27, 2006, the entire disclosure of which is incorporated herein by reference.

BACKGROUND

The present invention relates to a backup system, file server and backup method for backing up a virtual file system configured by integrating shared file systems provided by a plurality of file servers.

A file sharing server providing a shared file system for a plurality of clients to share files via a network is known. Also known is a system referred to as a Global Name Space for configuring a single virtual file system by integrating shared file systems provided by a plurality of file sharing servers, whereby the client accesses files through this virtual file system. A Global Name Space provides an environment as though the client is accessing a single file system regardless of which file sharing server among the plurality of file sharing servers configuring the virtual file system the client is connected to.

As a protocol used for backing up data stored in the shared file system provided by the file sharing server to a tape device, a protocol referred to as NDMP (Network Data Management Protocol) is known. In a backup process using NDMP, a backup server managing the backup designates a specific file sharing server to perform such backup. The file sharing server that was designated to perform the backup connects to a media server managing the tape device, and sends backup data to the media server. The media server that received the backup data writes such backup data in the tape device.

Incidentally, U.S. Pat. No. 6,026,414 refers to a file backup method of a distributed file system.

SUMMARY

In a system where the virtual file system is configured from a Global Name Space, there are cases where it is necessary to perform the backup of a virtual file system with NDMP. NDMP defines a backup protocol between a single file sharing server and a single media server. In order to perform the backup of the virtual file system, it is necessary to respectively designate the file sharing servers configuring the virtual file system to perform the backup.

Nevertheless, since the backup server to designate the backup, as with a client using the virtual file system, does not possess information relating to the local name space of the respective file sharing servers configuring the virtual file system, it is not able to specify the file sharing server managing files to be backed up among the plurality of file sharing servers configuring the virtual file system. Thus, there are cases where the backup server would designate the backup to a file sharing server that is not managing the files to be backed up.

Further, NDMP is prescribed whereby only a single file sharing server that was requested backup can be connected to a media server. In order to back up a virtual file system configured from a plurality of file sharing servers, it is necessary to connect all file sharing servers to a media server, but only one file sharing server can be connected to the media server under the NDMP protocol.

Further, among systems using a Global Name Space, as described in U.S. Pat. No. 6,671,773, there are those that support a so-called "file system migration function" where a file system provided by a shared file system is migrated between file sharing servers configuring the virtual file system. When a file system is migrated between file sharing servers with the file migration function, the backup server is not able to specify a file sharing server managing the files to be backed up among the plurality of file sharing servers configuring the virtual file system. Thus, there are cases where the backup server would designate the backup to a file sharing server that is not managing the files to be backed up.

Consequently, an object of the present invention is to provide a backup system, file server and backup method capable of appropriately backing up a virtual file system configured by integrating shared file systems provided by a plurality of file sharing servers.

The backup system of the present invention includes: a virtual file system for providing a file sharing service to a client via a Global Name Space integrating the name spaces of file systems respectively managed by a plurality of file servers; a backup server for managing the backup of the virtual file system; a media server for storing backup data of the virtual file system in an external storage; and a connection server for establishing a backup channel with the media server. When any file server among the plurality of file servers configuring the virtual file system receives a backup request from the backup server, the file server that received the backup request searches for a file server managing the files to be backed up among the plurality of file servers, and transfers the backup request to the searched file server. The file server that received the transfer of the backup request transfers the backup data to the media server via the connection server.

According to the present invention, it is possible to appropriately back up a virtual file system configured by integrating shared file systems provided by a plurality file servers.

DESCRIPTION OF THE DRAWINGS

FIG. 4 is a diagram showing an example of a backup schedule;

FIG. 5 is a diagram showing an example of GNS information;

FIG. 6 is a diagram showing an example of connection server address information;

DETAILED DESCRIPTION

An embodiment of the present invention is now explained taking a case of configuring a single virtual file system with a plurality of file sharing servers (hereinafter referred to as a "virtual file system") and backing up this virtual file system. Incidentally, in addition to backing up the virtual file system configured with a Global Name Space, the present invention is also applicable to the overall backup of systems configuring a cluster with a plurality of file sharing servers. Further, the following embodiments are merely examples, and the present invention shall in no way be limited by these embodiments.

Figure 1:
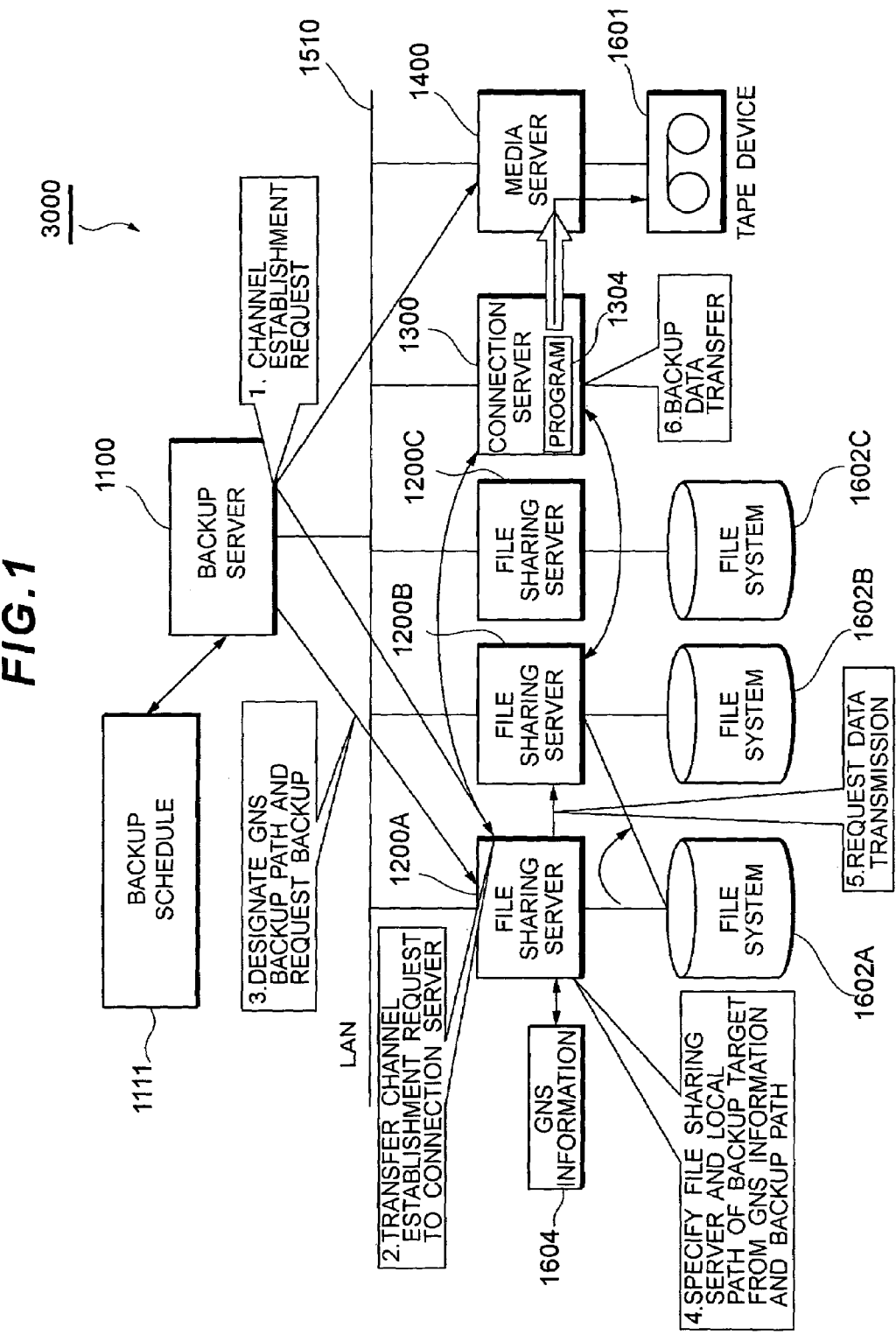
FIG. 1 is an explanatory diagram showing a backup routine of the backup system pertaining to the present embodiment.

FIG. 1 shows the system configuration of a backup system 3000 pertaining to the present embodiment. The backup system 3000 has a backup server 1100, a plurality of file sharing servers 1200A, 1200B, 1200C, a connection server 1300, and a media server 1400. The plurality of file sharing servers 1200A, 1200B, 1200C configure the virtual file system. The respective file sharing servers 1200A, 1200B, 1200C, for instance, are file servers such as a NAS (Network Attached Storage) server.

Foremost, the backup processing of the virtual file system is explained with reference to FIG. 1. The backup server 1100 notifies a backup channel establishment request to the file sharing server 1200A and media server 1400, respectively, based on a pre-scheduled backup schedule 1111. Since the backup channel establishment request may be notified to any file sharing server configuring the virtual file system, the backup server 1100 may also notify the backup channel establishment request to either the file sharing server 1200B or 1200C.

The file sharing server 1200A that received the backup channel establishment request from the backup server 1100 transfers the backup channel establishment request to the connection server 1300.

Next, the backup server 1100 sends a backup request designating a backup path to the file sharing server 1200A. A backup path is the path of a file to be backed up. Since the name space of the file systems 1602A, 1602B, 1602C respectively managed by the plurality of file sharing servers 1200A, 1200B, 1200C are integrated into a single name space with a Global Name Space, the backup server 1100 designates the backup path with a global path.

The file sharing server 1200A that received the backup request from the backup server 1100 compares GNS (Global Name Space) information 1604 and the backup path, and specifies the file sharing server managing the files to be backed up, and a local path of the files to be backed up. The GNS information 1604 shows the correspondence of the global path and local path of files managed by the respective file systems 1602A, 1602B, 1602C. Here, let it be assumed that the file sharing server managing the files to be backed up, for example, is the file sharing server 1200B.

The file sharing server 1200A requests the file sharing server 1200B to transfer the backup data. Then, the file sharing server 1200B sends the backup data to the connection server 1300. The connection server 1300 transfers the backup data received from the file sharing server 1200B to the media server 1400. The media server 1400 stores the backup data received from the connection server 1300 in a tape device 1601.

The connection server 1300 has a connection point for connecting to the media server 1400 via the backup channel, and a connection point for connecting from the file sharing servers 1200A, 1200B, 1200C. The communication procedure 10 for establishing the backup channel is based on the NDMP protocol. Under the NDMP protocol, only one server can be connected to the media server 1400 via the backup channel. Assuming that the media server 1400 directly connects the backup channel with the file sharing server 1200B, the media server 1400 will be able to receive backup data from the file sharing server 1200B, but will not be able to receive backup data from the file sharing server 1200A or 1200C. Thus, by interposing the connection server 1300 between the file sharing servers 1200A, 1200B, 1200C and the media server 1400, and connecting one connection point among the two connection points of the connection server 1300 to the backup channel based on the NDMP protocol, and connecting the other connection point to the file sharing servers 1200A, 1200B, 1200C, the connection server 1300 is able to receive backup data from the plurality of file sharing servers 1200A, 1200B, 1200C configuring the virtual file system without having to disconnect the backup channel.

Incidentally, as described later, the connection server 1300 is not essential, and, by a backup data transfer program 1304 controlling the functions of the connection server 1300 being mounted on any one among the backup server 1100, file sharing servers 1200A, 1200B, 1200C or media server 1400, any one among the backup server 1100, file sharing servers 1200A, 1200B, 1200C or media server 1400 may function as the connection server 1300.

Figure 2:
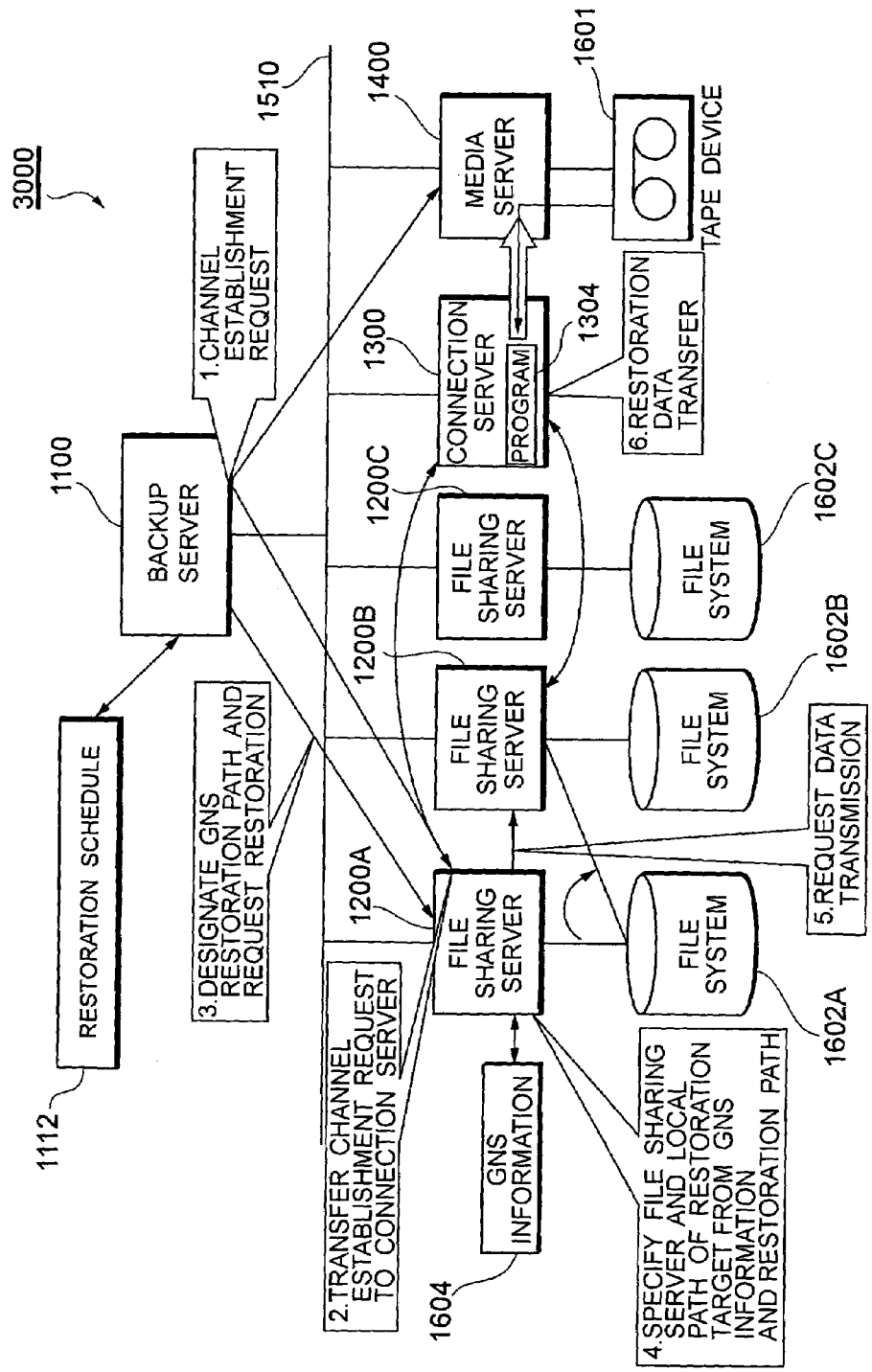
FIG. 2 is an explanatory diagram showing a restoration routine of the backup system pertaining to the present embodiment.

Next, the restoration processing of the virtual file system is explained with reference to FIG. 2. The backup server 1100 notifies a restoration channel establishment request to the file sharing server 1200A and media server 1400, respectively, based on a pre-scheduled restoration schedule 1112. Since the restoration channel establishment request may be notified to any file sharing server configuring the virtual file system, the backup server 1100 may also notify the restoration channel establishment request to either the file sharing server 1200B or 1200C.

The file sharing server 1200A that received the restoration channel establishment request from the backup server 1100 transfers the restoration channel establishment request to the connection server 1300.

Next, the backup server 1100 sends a backup request designating a restoration path to the file sharing server 1200A. A restoration path is the path of a file to be restored. Since the name space of the file systems 1602A, 1602B, 1602C respectively managed by the plurality of file sharing servers 1200A, 1200B, 1200C are integrated into a single name space with a Global Name Space, the backup server 1100 designates the restoration path with a global path.

The file sharing server 1200A that received the restoration request from the backup server 1100 compares GNS information 1604 and the restoration path, and specifies the file sharing server managing the files to be restored, and a local path of the files to be restored. The GNS information 1604 shows the correspondence of the global path and local path of files managed by the respective file systems 1602A, 1602B, 1602C. Here, let it be assumed that the file sharing server managing the files to be restored, for example, is the file sharing server 1200B.

The file sharing server 1200A requests the file sharing server 1200B to acquire the restoration data. Then, the media server 1400 sends the restoration data extracted from the tape device 1601 to the connection server 1300 via the restoration channel. The connection server 1300 transfers the restoration data received from the media server 1400 to the file sharing server 1200B. The file sharing server 1200B restores the files in the file system 1602B.

According to the present embodiment, since the connection server 1300 intermediates the connection between all file sharing servers 1200A, 1200B, 1200C configuring the virtual file system and the media server 1400, all file sharing servers 1200A, 1200B, 1200C configuring the virtual file system are able to send backup data to the media server 1400, or receive restoration data from the media server 1400.

Further, according to the present embodiment, when any file sharing server configuring the virtual file system receives a backup request or restoration request from the backup server 1100, the file sharing server that received the backup request or restoration request is able to request the file sharing server managing the files to be backed up to perform backup processing, or to request the file sharing server managing the files to be restored to perform restoration processing. In other words, the file sharing server that receives a backup request or restoration request from the backup server 1100 is able to distribute such backup request or restoration request to another file sharing server.

First Embodiment

Embodiments of the present invention are now explained with reference to the drawings.

Figure 3:
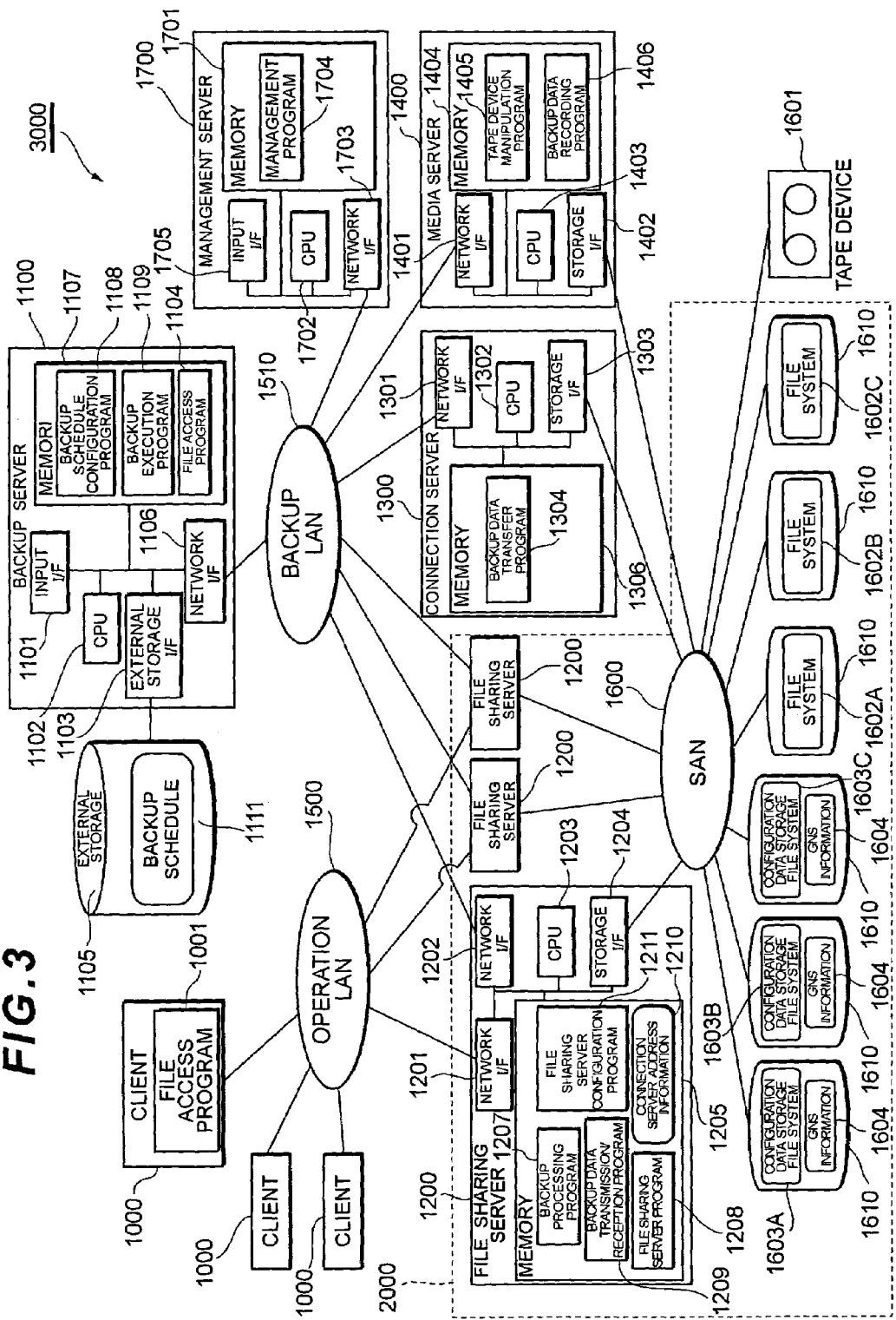
FIG. 3 is a system configuration of the backup system pertaining to the first embodiment.

FIG. 3 shows a system configuration of the backup system 3000. The backup system 3000 has a virtual file system 2000, a backup server 1100, a connection server 1300, and a media server 1400. The virtual file system 2000 includes a plurality of file sharing servers 1200, a plurality of file systems 1602A, 1602B, 1602C, and a plurality of configuration data storage file systems 1603A, 1603B, 1603C.

A client 1000 is a client (file client) that receives a file sharing service from the virtual file system 2000. The client 1000 has a file access program 1001 for accessing a shared file system via a Global Name Space.

The backup server 1100 has a data input device (hereinafter referred to as an "input I/F") 1101, a CPU 1102, an external storage connection interface controller (hereinafter referred to as an "external storage I/F") 1103, a network controller (hereinafter referred to as a "network I/F") 1106, and a memory 1107. The external storage I/F 1103 is connected to an external storage 1105. The external storage 1105 is a device for retaining a backup schedule 1111 recording the date and time of executing backup. The network I/F 1106 is connected to a backup LAN (Local Area Network) 1510 to be used in data communication at the time of backup.

A backup schedule configuration program 1108, a backup execution program 1109, and a file access program 1104 are stored in the memory 1107.

The backup schedule configuration program 1108 is a program for the CPU 1102 to store the backup execution data, which was input by the administrator managing the backup schedule via the input I/F 1101, in the backup schedule 1111.

The backup execution program 1109 is a program for the CPU 1102 to execute backup processing based on the backup execution data recorded in the backup schedule 1111. When the CPU 1102 executes backup processing, it reads the backup schedule 1111 stored in the external storage 1105 via the external storage I/F 1103, and acquires the backup execution date. The CPU 1102 executes backup processing on the backup execution date. Details regarding the backup processing will be described later.

The file sharing server 1200 has network I/Fs 1201, 1202, a CPU 1203, a storage interface controller (hereinafter referred to as a "storage I/F") 1204, and a memory 1205. The network I/F 1201 is connected to an operational LAN 1500 to be used in the file sharing service. The network I/F 1202 is connected to a backup LAN 1510. The storage I/F 1204 is connected to a SAN (Storage Area Network) 1600.

The file sharing server 1200 is connected to the file systems 1602A, 1602B, 1602C connected to the SAN 1600 via the storage I/F 1204. The client 1000 is able to access files in the file systems 1602A, 1602B, 1602C via the file sharing server 1200. Each of the plurality of file sharing servers 1200 configuring the virtual file system 2000 exclusively uses the file systems 1602A, 1602B, 1602C. For example, when a certain file sharing server is using the file system 1602A, the other file sharing servers are not able to use the file system 1602A. The file systems 1602A, 1602B, 1602C are respectively created to the storage 1610. The storage 1610 is a hard disk drive, optical disk drive, tape device or the like.

The configuration data storage file systems 1603A, 1603B, 1603C provide system areas of the file sharing server 1200, and store system information such as GNS information 1604. Each of the plurality of file sharing servers 1200 configuring the virtual file system 2000 exclusively uses the configuration data storage file systems 1603A, 1603B, 1603C. The client 1000 is not able to access the configuration data storage file systems 1603A, 1603B, 1603C via the file sharing server 1200. The configuration data storage file systems 1603A, 1603B, 1603C are respectively created to the storage 1610. The storage 1610 is a hard disk drive, optical disk drive, tape device or the like.

Incidentally, in the following explanation, unless specifically differentiated, the file systems 1602A, 1602B, 1602C are referred to as "file system 1602". Similarly, when the configuration data storage file systems 1603A, 1603B, 1603C are not differentiated, these are referred to as "configuration data storage file system 1603".

A backup processing program 1207, a file sharing server program 1208, a backup data send and receive program 1209, connection server address information 1210, and a file sharing server configuration program 1211 are stored in the memory 1205.

The backup processing program 1207 processes the backup processing request of the backup execution program 1109.

The backup processing program 1207 is a program for the CPU 1203 to receive from the backup execution program 1109 an establishment request of a channel to be used in the backup (backup channel establishment request), and transfer the backup channel establishment request to the connection server 1300 via the backup LAN 1510. When the backup processing program 1207 is executed by the CPU 1203, the CPU 1203 acquires a network address of the connection server 1300 from the connection server address information 1210 stored in the memory 1205.

Further, the backup processing program 1207 is also a program for the CPU 1203 to convert the backup path (global path) of the virtual file system 2000 into a path (local path) of the local file system of the file sharing server 1200 configuring the virtual file system 2000. When the backup processing program 1207 is executed by the CPU 1203, the CPU 1203 receives the backup path of the virtual file system 2000 from the backup execution program 1109, reads the GNS information 1604 stored in the configuration data storage file system 1603, compares the backup path and GNS information 1604 of the virtual file system 2000, and converts the global path into a local path.

The GNS information 1604 is information for configuring a cluster with a plurality of file sharing servers 1200, and thereby configuring a single virtual file system 2000.

Further, the backup processing program 1207 requests backup processing via the backup LAN 1510 based on all file sharing servers 1200 to be subject to backup processing obtained by comparing the backup path and GNS information 1604 of the virtual file system 2000, and the local path of the local file system of the file sharing server 1200.

The backup data send and receive program 1209 is a program to be executed by the CPU 1203, and receives a backup request and path of a local file system from the backup processing program 1207 of another file sharing server or the backup processing program 1207 of one's own file sharing server, reads the files stored in the local file system, and sends backup data to the backup data transfer program 1304 of the connection server 1300.

In other words, when the obtained local path of the file sharing server 1200 is a local path of one's own file sharing server 1200, the CPU 1203 to execute the backup processing program 1207 reads the files stored in the file system 1602 corresponding to such local path. Meanwhile, when the obtained local path of the file sharing server 1200 is that of one of the other file sharing servers 1200, the CPU 1203 sends a backup request to the corresponding file sharing server 1200 via the backup LAN 1510.

The file sharing server program 1208 receives a file path or directory path from the client 1000 using the file sharing service provided by the file sharing server 1200, and returns the acquisition result of files to the client 1000. The acquisition result may include the contents of the files.

The file sharing server configuration program 1211 is a program to be executed by the CPU 1203, and processes the request for configuring the address of the connection server 1300 (hereinafter referred to as a "connection server address configuration request") requested from the management program 1704 in the management server 1700.

When the file sharing server configuration program 1211 receives a connection server address configuration request from the management program 1704, the file sharing server configuration program 1211 receives the network address of the connection server 1300, and stores this in the connection server address information 1210 in the memory 1205.

The connection server 1300 has a network I/F 1301, a CPU 1302, a storage I/F 1303, and a memory 1306. The network I/F 1301 is connected to the backup LAN 1510. The storage I/F 1303 is connected to the SAN 1600.

A backup data transfer program 1304 is stored in the memory 1306.

The backup data transfer program 1304 is a program for establishing a channel for backup (hereinafter referred to as a "backup channel") between the connection server 1300 and media server 1400, receiving backup data from the file sharing server 1200 configuring the virtual file system 2000, and sending backup data to the media server 1400 via the backup channel.

The backup data transfer program 1304 receives the backup channel establishment request transferred from the backup processing program 1207 in the file sharing server 1200, and establishes a backup channel between the connection server 1300 and media server 1400. Thereafter, the backup data transfer program 1304 receives backup data from the backup data send and receive program 1209 in the file sharing server 1200, and sends such backup data to the media server 1400 via the backup channel.

The backup channel between the media server 1400 and connection server 1300 is not limited to a specific communication media. In addition to the backup LAN 1510, for example, the backup channel may be a channel using the SAN 1600.

The media server 1400 has a network I/F 1401, a storage I/F 1402, a CPU 1403, and a memory 1404. The network I/F 1401 is connected to the backup LAN 1510. The storage I/F 1402 is connected to the SAN 1600. The media server 1400 is connected to the tape device 1601 via the SAN 1600.

A tape device manipulation program 1405, and a backup data recording program 1406 are stored in the memory 1404.

The tape device manipulation program 1405 is a program to be executed by the CPU 1403, and is used for manipulating the tape device 1601. When the tape device manipulation program 1405 is executed by the CPU 1403, the CPU 1403 receives information for manipulating the tape device 1601 from the backup execution program 1109, and manipulates the tape device 1601 based on such information.

The backup data recording program 1406 is a program for creating a connection point (communication port) for the backup channel, waiting for the connection server 1300 to be connected to the backup channel, receiving backup data from the connection server 1300 once the connection server 1300 is connected to the backup channel, and storing such backup data in the tape device 1601.

When the backup data recording program 1406 is executed by the CPU 1403, the CPU 1403 receives a backup request from the backup execution program 1109, creates a connection point for the backup channel, and sends the processing result to the backup execution program 1109. When the backup data recording program 1406 receives backup data, it stores such backup data in the tape device 1601 from the storage I/F 1402 via the SAN 1600.

Incidentally, the device for storing backup data of the virtual file system 2000 is not limited to the tape device 1601, and an arbitrary external storage may be used.

The management server 1700 has a memory 1701, a CPU 1702, a network I/F 1703, and an input I/F 1705. The network I/F 1703 is connected to the backup LAN 1510.

A management program 1704 is stored in the memory 1701.

The management program 1704 manages the devices (backup server 1100, file sharing server 1200, connection server 1300, and media server 1400) involved in the backup of the virtual file system 2000. The management program 1704 configures connection server address information 1210 of the file sharing server 1200 via the input I/F 1705.

FIG. 4 shows an example of the backup schedule 1111 stored in the external storage 1105 connected to the backup server 1100. In the backup schedule 1111, a "date" 2001 showing the backup date, a "GNS backup path" 2002 showing the file of the backup target or the global path of the directory, and a "server" 2003 showing the network address (for example, an IP address) of the file sharing server 1200 to become the request destination of backup are respectively associated and registered. Record of the backup schedule 1111 includes the "date" 2001, "GNS backup path" 2002, and "server" 2003.

FIG. 5 shows an example of the GNS information 1604 stored in the configuration data storage file system 1603. In the GNS information 1604, a "GNS path" 2011 showing the global path of a file (hereinafter referred to as a "virtual file") in the virtual file system 2000 and its file name, a "server" 2012 showing the network address (for example, an IP address) of the file sharing server 1200 storing a real file (hereinafter referred to as an "real file") corresponding to the virtual file, and a "local path" 2013 showing the local path of the file sharing server 1200 storing the real file are respectively associated and registered. Record of the GNS information 1604 includes the "GNS path" 2011, "server" 2012, and "local path" 2013.

FIG. 6 shows an example of the connection server address information 1210 storing address information of the connection server 1300. The network address (for example, an IP address) of the connection server 1300 is registered in the connection server address information 1210.

Figure 7:
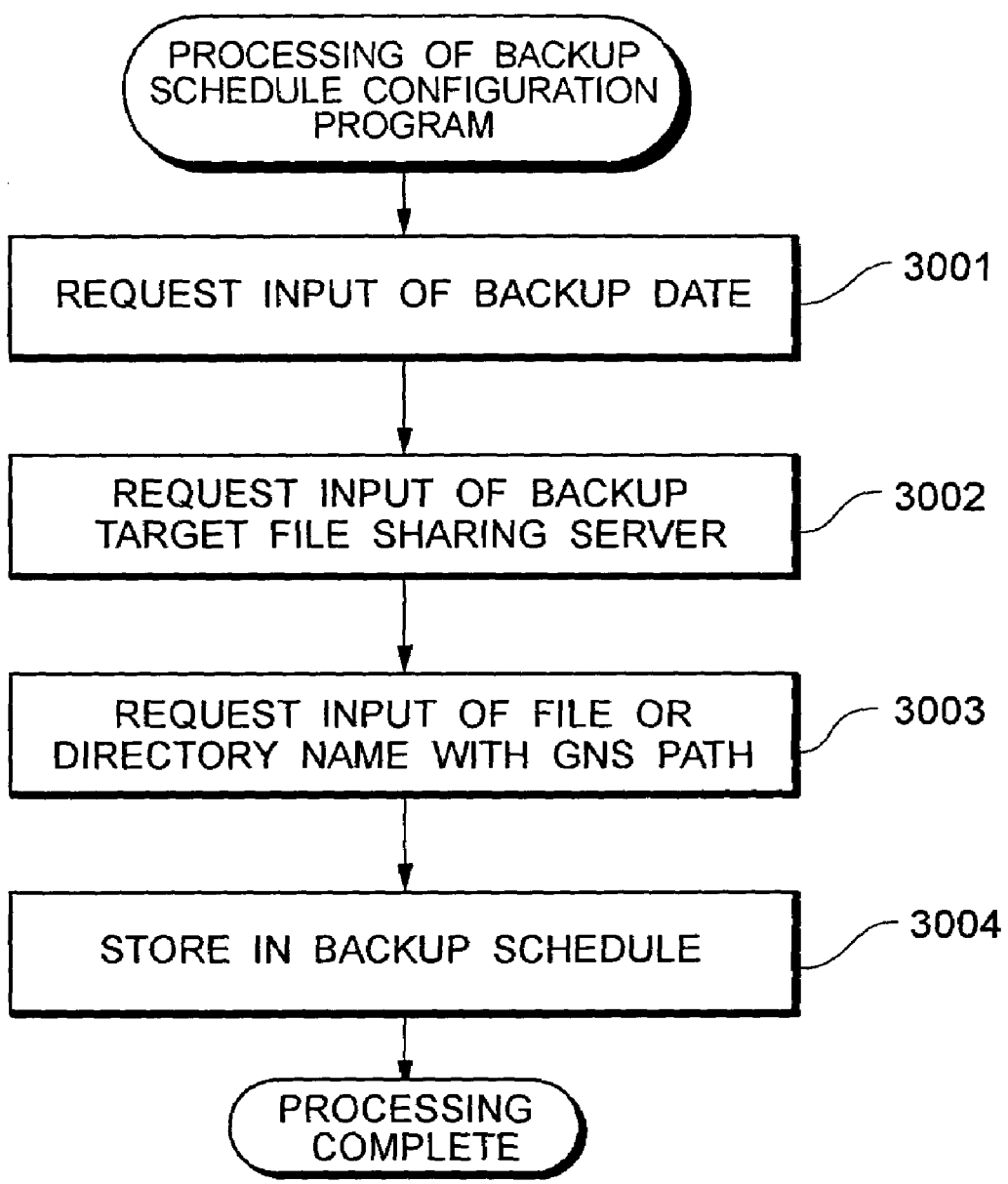
FIG. 7 is a flowchart showing the configuration processing of a backup schedule.

FIG. 7 shows an example of the processing performed as a result of the backup schedule configuration program 1108 in the backup server 1100 being executed.

When an administrator managing the backup schedule is to configure a backup, the backup schedule configuration program 1108 in the backup server 1100 requests a backup date (step 3001). Then, the administrator inputs the backup date via the input I/F 1101.

Next, the backup schedule configuration program 1108 requests address information of the file sharing server 1200 to be backed up (step 3002). Then, the administrator inputs the address information of the file sharing server 1200 to be backed up via the input I/F 1101.

A Global Name Space configures the virtual file system 2000 by integrating a plurality of file sharing servers 1200. The client 1000 using the file service of the virtual file system 2000 is able to use the virtual file system 2000 regardless of which file sharing server 1200 among the plurality of file sharing servers 1200 configuring the virtual file system 2000 the client 1000 is connected to. The address information of the file sharing server 1200 requested by the backup schedule configuration program 1108 may be the address information of any file sharing server 1200 among the plurality of file sharing servers 1200 configuring the virtual file system 2000.

Next, the backup schedule configuration program 1108 requests the input of the file name or directory name to be backed up (step 3003). The administrator inputs the file name or directory name to be backed up from the input I/F 1101 using a file name (hereinafter referred to as a "virtual file name") in the virtual file system 2000. Here, the file name or directory name to be backed up input by the administrator with the input I/F 1101 is acquired personally by the administrator from the file access program 1004 prior to the administrator inputting the file name or directory name.

Finally, the backup configuration program 1108 stores the information ("date", "server", and "GNS backup path") input by the administrator in the backup schedule 1111 stored in the external storage 1105 (step 3004).

Figure 8:
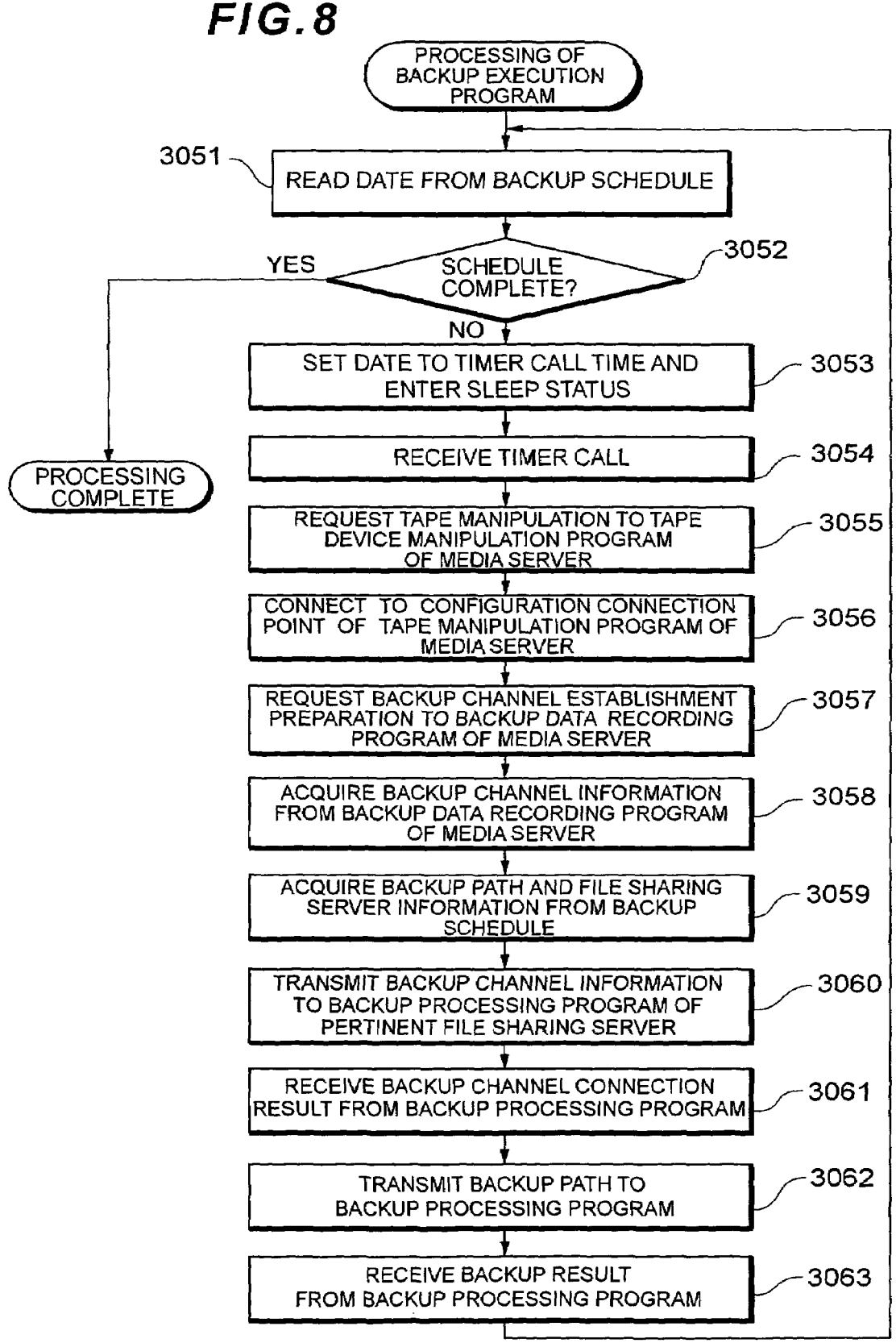
FIG. 8 is a flowchart showing the backup execution processing.

FIG. 8 shows an example of the processing performed as a result of the backup execution program 1109 of the backup server 1100 by being executed.

The backup execution program 1109 reads the backup schedule 1111 configured with the backup schedule configuration program 1107 from the external storage 1105 (step 3051).

Next, the backup execution program 1109 determines whether the backup schedule 1111 read at step 3051 has been fully completed (step 3052). Here, the backup execution program 1109 compares the backup date registered in the backup schedule 1111 with the time of the backup server, and determines whether the backup schedule 1111 is complete or not. Here, the expression "whether the backup schedule 1111 is complete or not" refers to a situation where all backup data registered in the backup schedule 1111 are of dates older than the time of the backup server 1100. In this case, the backup execution program 1109 determines that the backup schedule 1111 is complete (step 3052; YES), and the processing is ended.

When the backup execution program 1109 determines that a part of the schedule registered in the backup schedule 1111 is incomplete (step 3052; NO), the routine proceeds to step 3053. Here, the expression "a part of the schedule registered in the backup schedule 1111 is incomplete" refers to a situation where a schedule among all backup dates registered in the backup schedule 1111 is of a date that is later than the time of the backup server 1100.

When a part of the schedule registered in the backup schedule 1111 is incomplete (step 3052; NO), the backup execution program 1109 selects the record registering a future backup data that is closest to the time of the backup server 1100 among the backup dates registered in the backup schedule 1111.

Then, the backup execution program 1109 uses the function of the operating system to configure the backup data registered in such record as one's own call time (timer call time), and once enters a sleep status (step 3053).

When it becomes the timer call time, the backup execution program 1109 in a sleep status receives a timer call from the operating system and resumes processing (step 3054).

Next, in order to prepare for backup, the backup execution program 1109 requests the manipulation of the tape device 1601 to the tape device manipulation program 1405 in the media server 1400 (step 3055). The media server 1400 manages the tape device 1601, and manipulates the tape device 1601 as necessary. The backup server 1100 manages the data recorded on the tape of the tape device 1601.

Next, the backup execution program 1109 connects to a connection point (hereinafter referred to as a "configuration connection point") for configuring the backup data recording program 1406 in the media server 1400 (step 3056).

The backup execution program 1109 requests the backup data recording program 1406 in the media server 1400 to prepare for the establishment of the backup channel through the channel connected to the configuration connection point at step 3056 (step 3057). Specific processing for the backup data recording program 1406 in the media server 1400 to prepare for the establishment of the backup channel will be described later.

Here, a backup channel is a channel dedicated to backup that is established between the connection server 1300 and media server 1400 for backing up the data stored in the file systems 1602A, 1602B, 1602C managed by the file sharing server 1200 in the tape device 1601. Data to be backed up is sent to the media server 1400 via the backup channel. The backup channel may be established with the backup LAN 1510 using the Internet protocol, or established with the SAN 1600 using the fibre channel protocol.

The backup execution program 1109 receives the backup channel information, which is the result of the backup channel establishment preparation requested at step 3057, from the backup data recording program 1406 in the media server

1400 (step 3058). At this point in time, preparation for establishment of the backup channel in the media server 1400 becomes complete.

Next, the backup execution program 1109 acquires information on the "GNS backup path" 2002 and "server" 2003 from the record of the backup schedule 1111 registering the backup date coinciding with the timer call time (step 3059).

The backup execution program 1109 requests the establishment of a backup channel to the backup processing program 1207 in the file sharing server 1200 having the network address showing the "server" 2003 acquired at step 3059, and sends the backup channel information acquired at step 3058 (step 3060). The backup channel information includes the connection point of the backup channel created with the backup data recording program 1406 in the media server 1400, and the address information of the media server 1400.

Next, the backup execution program 1109 receives a report on the result of backup channel establishment from the backup processing program 1207 in the file sharing server 1200 (step 3061).

Next, in order to request the transmission of the backup data, the backup execution program 1109 transits the "GNS backup path" 2002 acquired at step 3059 to the backup processing program 1207 in the file sharing server 1200 (step 3062).

Finally, the backup execution program 1109 acquires the execution result of backup from the backup processing program 1207 of the file sharing server 1200 (step 3063). Here, the sequential flow of backup processing is complete.

The backup execution program 1109 returns to step 3051 in order to continue executing the unexecuted backup processing in the backup schedule registered in the backup schedule 1111. Subsequently, until it is determined that the schedule is completed at step 3052, the backup execution program 1109 continues the processing of step 3051 to step 3063.

Figure 9:
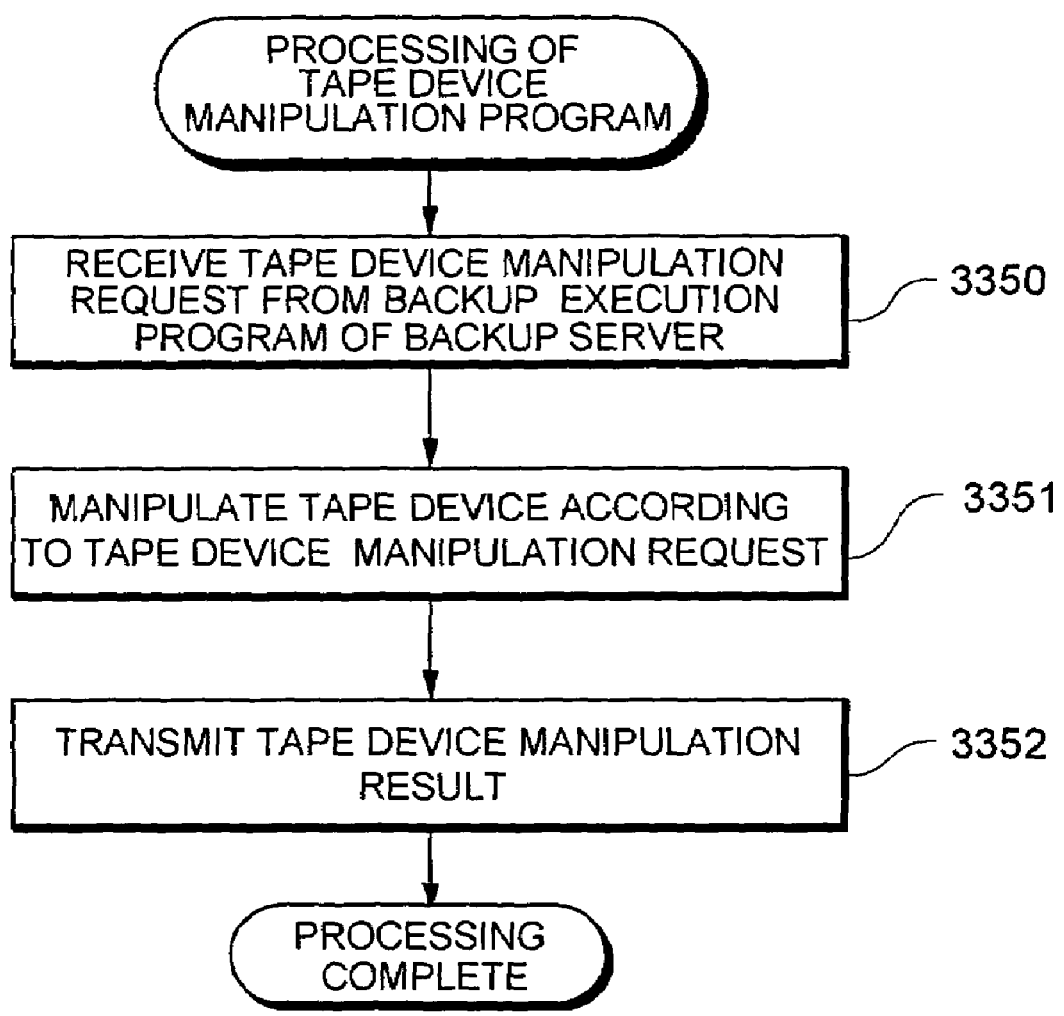
FIG. 9 is a flowchart showing the tape device manipulation processing.

FIG. 9 shows an example of the processing performed as a result of the tape device manipulation program 1405 in the media server 1400 being executed.

The tape device manipulation program 1405 manipulates the tape device 1601 in response to the request from the backup execution program 1109 in the backup server 1100.

Foremost, the tape device manipulation program 1405 receives a manipulation request of the tape device 1601 from the backup execution program 1109 (step 3350).

Next, the tape device manipulation program 1405 manipulates the tape device 1601 in response to the tape manipulation request of the backup execution program 1109 (step 3351).

Finally, the tape device manipulation program 1405 sends the manipulation result of the tape device 1601 to the backup execution program 1109 (step 3352).

Figure 10:
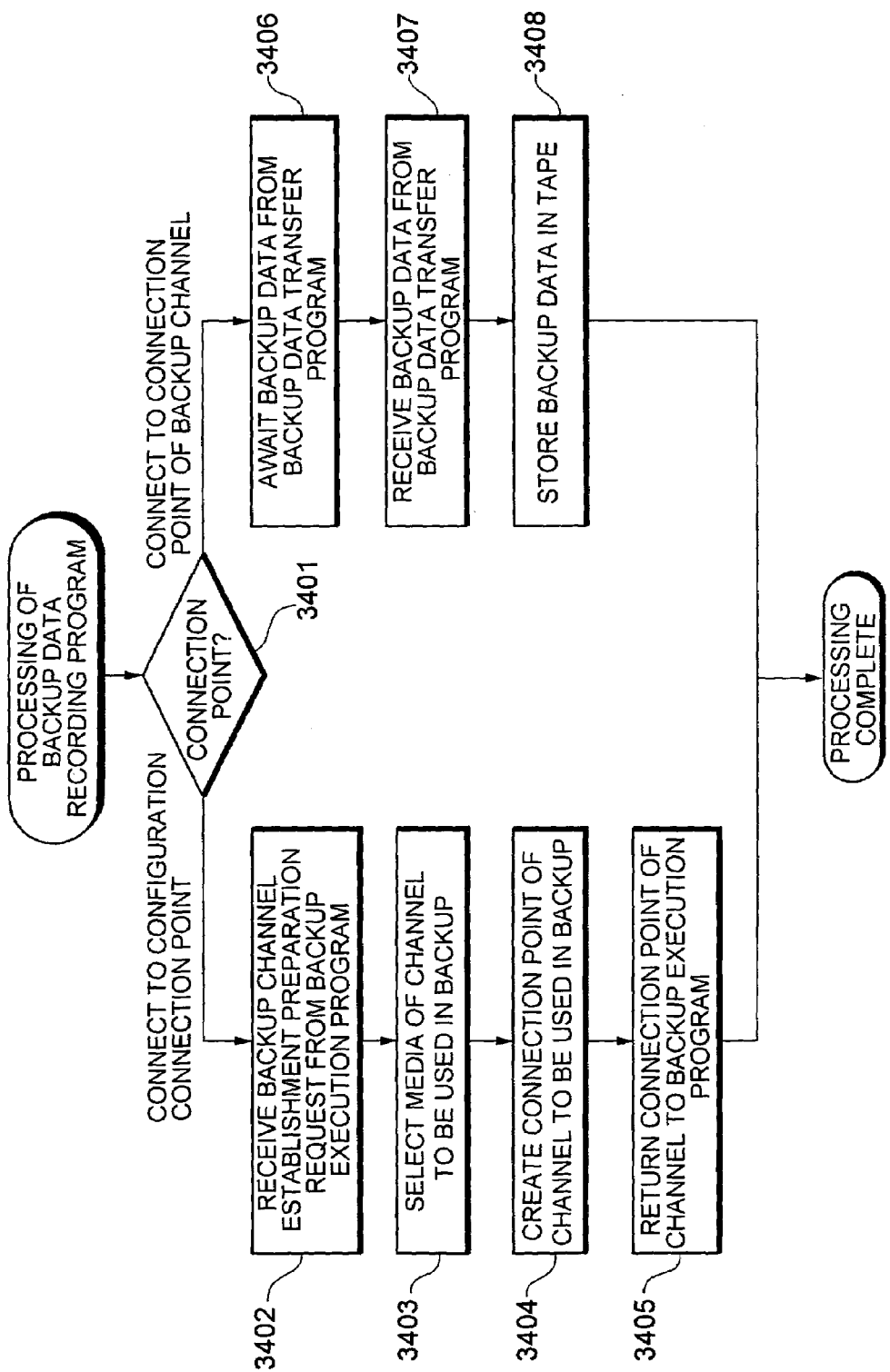
FIG. 10 is a flowchart showing the processing for storing backup data in the tape device.

FIG. 10 shows an example of the processing performed as a result of the backup data recording program 1406 in the media server 1400 being executed.

The backup data recording program 1406 has two connection points. One connection point is a configuration connection point to be used upon configuring the backup data recording program 1406, and the other connection point is a connection point to be used in the backup channel for receiving backup data. The latter connection point to be used in the backup channel is created based on the request from the backup execution program 1109.

The backup data recording program 1406 determines the connection point of the program connected for requesting processing to the backup data recording program 1406 (step 3401). Here, the configuration connection point is connected from the backup execution program 1109 in the backup server 1100 in order to configure the backup channel. Meanwhile, the connection point of the backup channel is connected from the backup data transfer program 1304 in the connection server 1300 for sending and receiving backup data.

When the backup execution program 1109 in the backup server 1100 is connected to the configuration connection point, the backup data recording program 1406 receives a configuration request for establishing the backup channel (backup channel establishment preparation request) from the backup execution program 1109 (step 3402).

Next, the backup data recording program 1406 selects a channel media to be used in the backup (step 3403). Here, channel media, for instance, is the backup LAN 1510 employing the Internet protocol or the SAN 1600 employing the fibre channel protocol. A channel media will suffice so as long as it is a channel enabling the one-on-one communication between the backup data recording program 1406 and the program to become the transmission source of backup data, and is not limited to a media.

Next, the backup data recording program 1406 creates a connection point of the backup channel to be used in the backup (step 3404), and sends information on the connection point used in the backup channel to the backup execution program 1109 (step 3405).

Meanwhile, when the backup data transfer program 1304 in the connection server 1300 is connected to the connection point of the backup channel created at foregoing step 3402 to step 3405, the backup data recording program 1406 waits for backup data to be sent from the backup data transfer program 1304 in the connection server 1300 (step 3406).

Next, when the backup data recording program 1406 receives backup data from the backup data transfer program 1304 (step 3407), it stores the received backup data in the tape device 1601 connected to the SAN 1600 via the storage I/F 1402 (step 3408). Processing of the backup data transfer program 1304 in the connection server 1300 will be described later.

Figure 11:
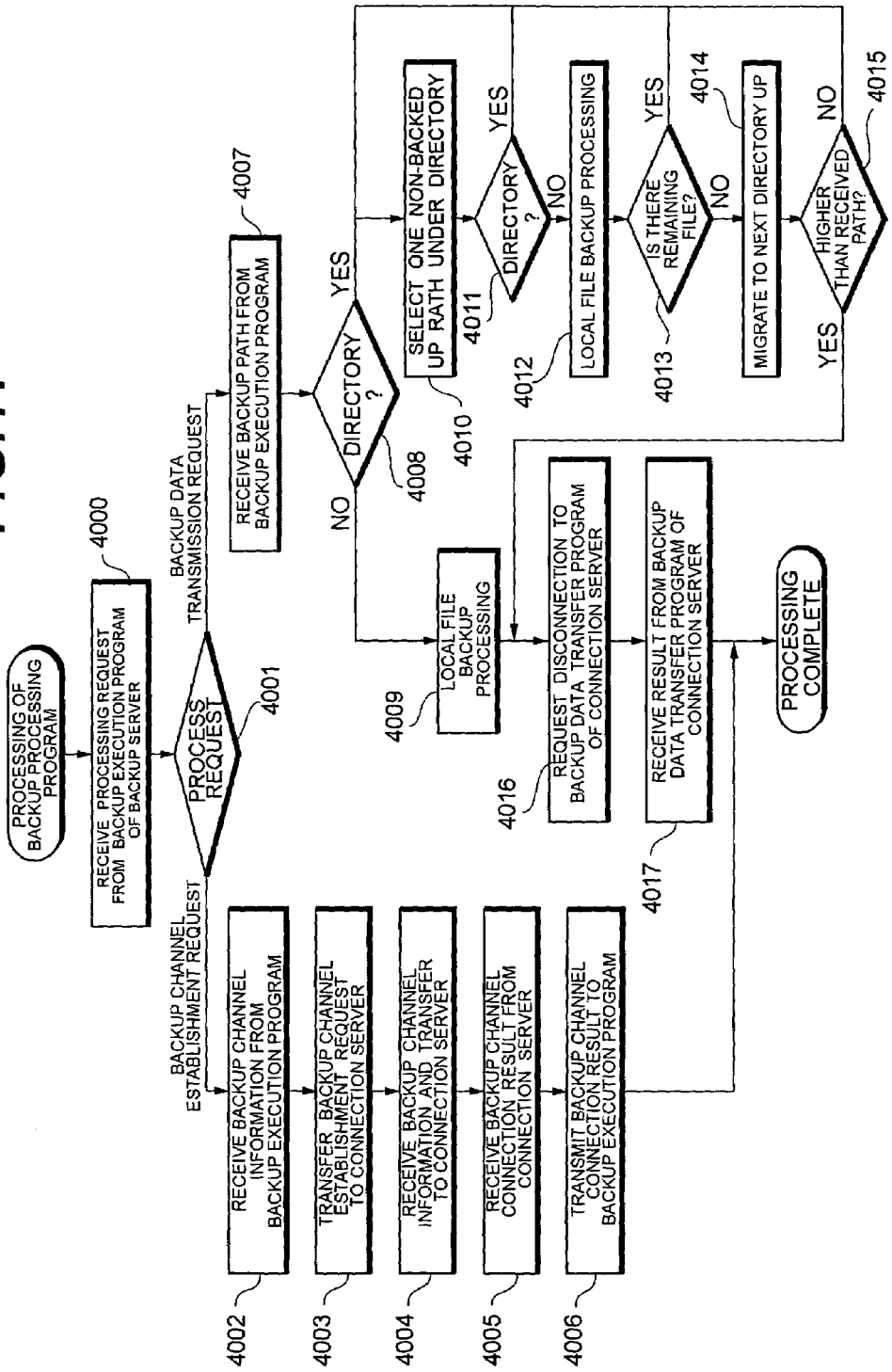
FIG. 11 is a flowchart showing the backup processing with a file sharing server.

FIG. 11 shows an example of processing performed as a result of the backup processing program 1207 in the file sharing server 1200 being executed.

Foremost, the backup processing program 1207 receives a processing request from the backup execution program 1109 in the backup server 1100 (step 4000), and determines the content of such processing request (step 4001).

When the processing request received by the backup processing program 1207 is an establishment request of the backup channel (backup channel establishment request), the backup processing program 1207 receives backup channel information from the backup execution program 1109 (step 4002), and transfers the backup channel establishment request to the backup data transfer program 1304 in the connection server 1300 (step 4003).

Further, the backup processing program 1207 receives backup channel information from the backup execution program 1109, and transfers this to the backup data transfer program 1304 in the connection server 1300 (step 4004). Then, the backup processing program 1207 receives a report on the result of the backup channel connection from the backup data transfer program 1304 in the connection server 1300 (step 4005), and sends such report to the backup execution program 1109 (step 4006).

Meanwhile, when the processing request received by the backup processing program 1207 is a backup data transmission request, the backup processing program 1207 receives a path of the backup target (hereinafter referred to as a "backup path") from the backup execution program 1109 (step 4007). Here, the backup path received by the backup processing program 1207 is a path on the virtual file system 200 configured by a Global Name Space, and is not a path (local path) of files (hereinafter referred to as "real files") stored in the file systems 1602A, 1602B, 1602C respectively managed by the plurality of file sharing servers 1200 configuring the virtual file system 2000.

Next, the backup processing program 1207 determines whether the backup path received at step 4007 indicates a directory or a file (step 4008).

When the backup path received by the backup processing program 1207 indicates a file (step 4008; NO), the backup processing program 1207 performs local file backup processing (step 4009). Details regarding the local file backup processing will be described later.

Meanwhile, when the backup path received by the backup processing program 1207 indicates a directory (step 4008; YES), the backup processing program 1207 selects one path in such directory and which is a path that has not been backed up (step 4010).

The backup processing program 1207 determines whether the backup path selected at step 4010 indicates a directory or a file (step 4011) and, when it indicates a directory (step 4011; YES), selects a path in such directory and which is a path that has not been backed up (step 4010).

Meanwhile, when the backup path selected at step 4010 indicates a file (step 4011; NO), the backup processing program 1207 performs local file backup processing (step 4012). Details regarding the local file backup processing will be described later.

Next, the backup processing program 1207 checks whether there is a path that has not been backed up in the directory that is currently being backed up (step 4013).

When there is a path not yet subject to backup processing (step 4013; YES), the backup processing program 1207 returns to step 4010.

Meanwhile, when the backup processing program 1207 has completed the backup processing for all paths (step 4013; NO), the backup processing program 1207 moves the directory of the backup target to a directory in the next hierarchy up (step 4014).

Next, the backup processing program 1207 determines whether the directory of the backup target moved to a directory of a hierarchy that is higher than the directory received by the backup processing program 1207 at step 4007 (step 4015).

When the directory of the backup target is not a directory of a hierarchy that is higher than the directory received by the backup processing program 1207 at step 4007 (step 4015; NO), the backup processing program 1207 configures the directory of the backup target to a directory in the next hierarchy up, and returns to S4010.

When the directory of the backup target is a directory of a hierarchy that is higher than the directory received by the backup processing program 1207 at step 4007 (step 4015; YES), the backup processing program 1207 requests the disconnection of the backup channel to the backup data transfer program 1304 in the connection server 1300 (step 4016).

Next, the backup processing program 1207 receives a report on the result of backup channel disconnection processing from the backup data transfer program 1304 in the connection server 1300 (step 4017).

As described above, when the backup path received by the backup processing program 1207 at S4007 indicates a directory, step 4008 to step 4015 are executed. Here, when a plurality of files in the directory of the virtual file system 2000 are stored in the plurality of file sharing servers 1200, the backup processing program 1207 notifies a backup request to the file sharing server 1200 managing the files to be backed up each time it processes step 4012. As a result, it is possible to back up the entire virtual file system 2000.

Incidentally, in order to back up the entire virtual file system 2000, it is necessary to search the files to be backed up while analyzing the path, and perform conversion processing from a global path to a local path regarding the respective files. The sequential processing from step 4008 to step 4015 shows an example of the retrieval processing of files, but is not limited to the retrieval processing of files. For example, the retrieval processing of files may back up all file in the directory, and move to a lower directory. Further, when the backup path received by the backup processing program 1207 at S4007 is a directory, the backup processing program 1207 may select all records having a GNS path including a backup path among the records of the GNS information 1604 and execute backup processing.

Figure 12:
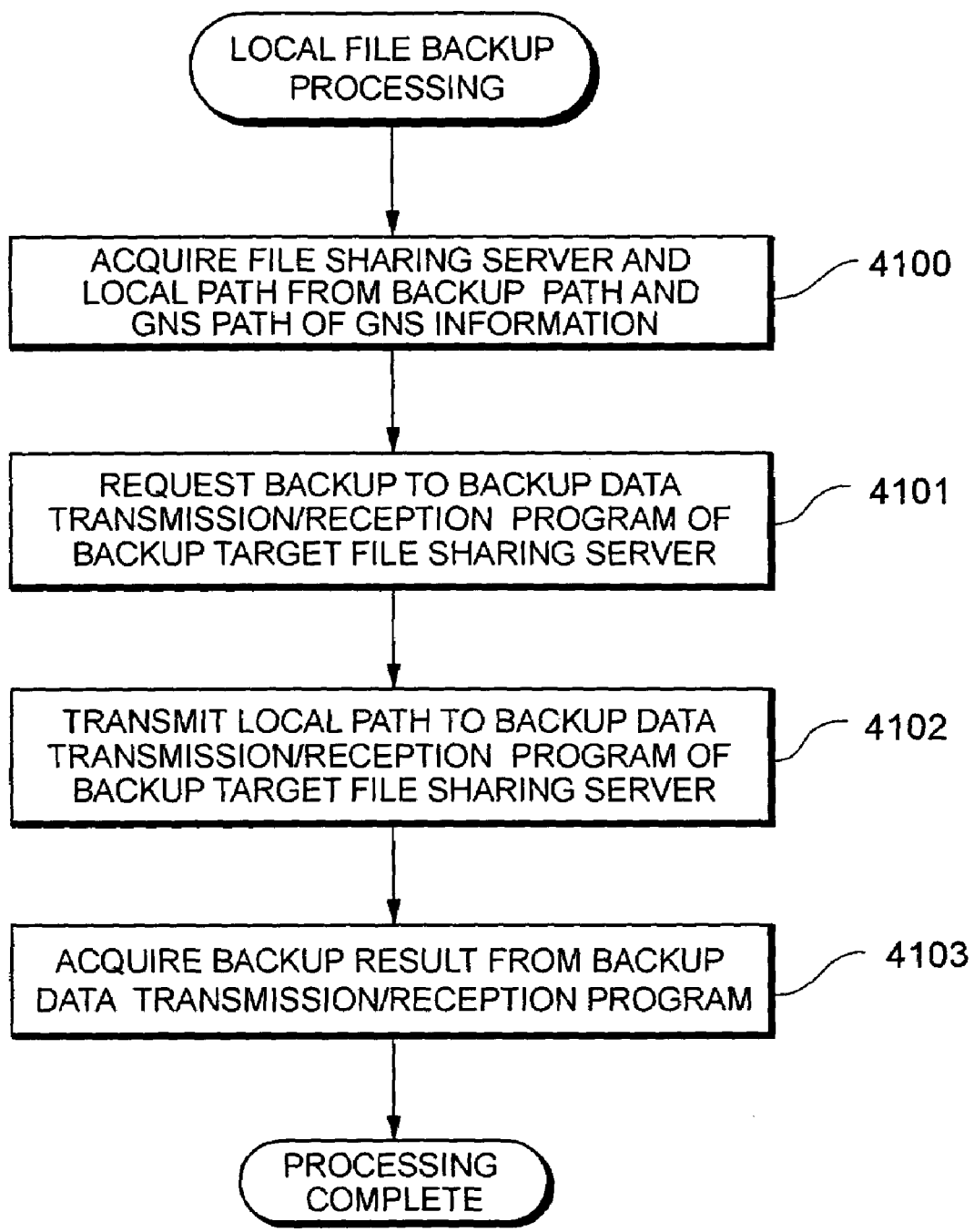
FIG. 12 is a flowchart showing the local backup processing.

FIG. 12 shows an example of the local file backup processing to be executed by the backup processing program 1207.

The backup processing program 1207 searches for GNS information 1604 stored in the configuration data storage file systems 1603A, 1603B, 1603C in order to acquire the file sharing server 1200 managing the real files designated with the backup path acquired from the backup execution program 1109 at step 4007, and the path (hereinafter referred to as a "local path") of the real files managed by such file sharing server 1200. The backup processing program 1207 compares the backup path acquired at step 4007 and the GNS path in the GNS information 1604, and acquires the network address and local path of the file sharing server 1200 (step 4100).

Next, the backup processing program 1207 issues a backup request to the backup data send and receive program 1209 in the file sharing server 1200 managing the real files acquires at step 4100 (step 4101), and further sends a local path to the backup data send and receive program 1209 (step 4102).

In other words, upon referring to the network address and local path step 4100 of the file sharing server 1200 acquired at step 4100, if the corresponding file sharing server 1200 is in itself the file sharing server 1200 including the CPU 1203 to execute the backup processing program 1207, the CPU 1203 activates the backup data send and receive program 1209, and executes the processing of the backup data send and receive program 1209. Meanwhile, if the corresponding file sharing server 1200 is another file sharing server 1200 other than the file sharing server 1200 including the CPU 1203 to execute the backup processing program 1207, it issues a backup request to such other file sharing server 1200 via the network I/F 1202.

Next, the backup processing program 1207 receives the backup result from the backup data send and receive program 1209 of the file sharing server 1200 that requested the execution of backup (step 4103).

Figure 13:
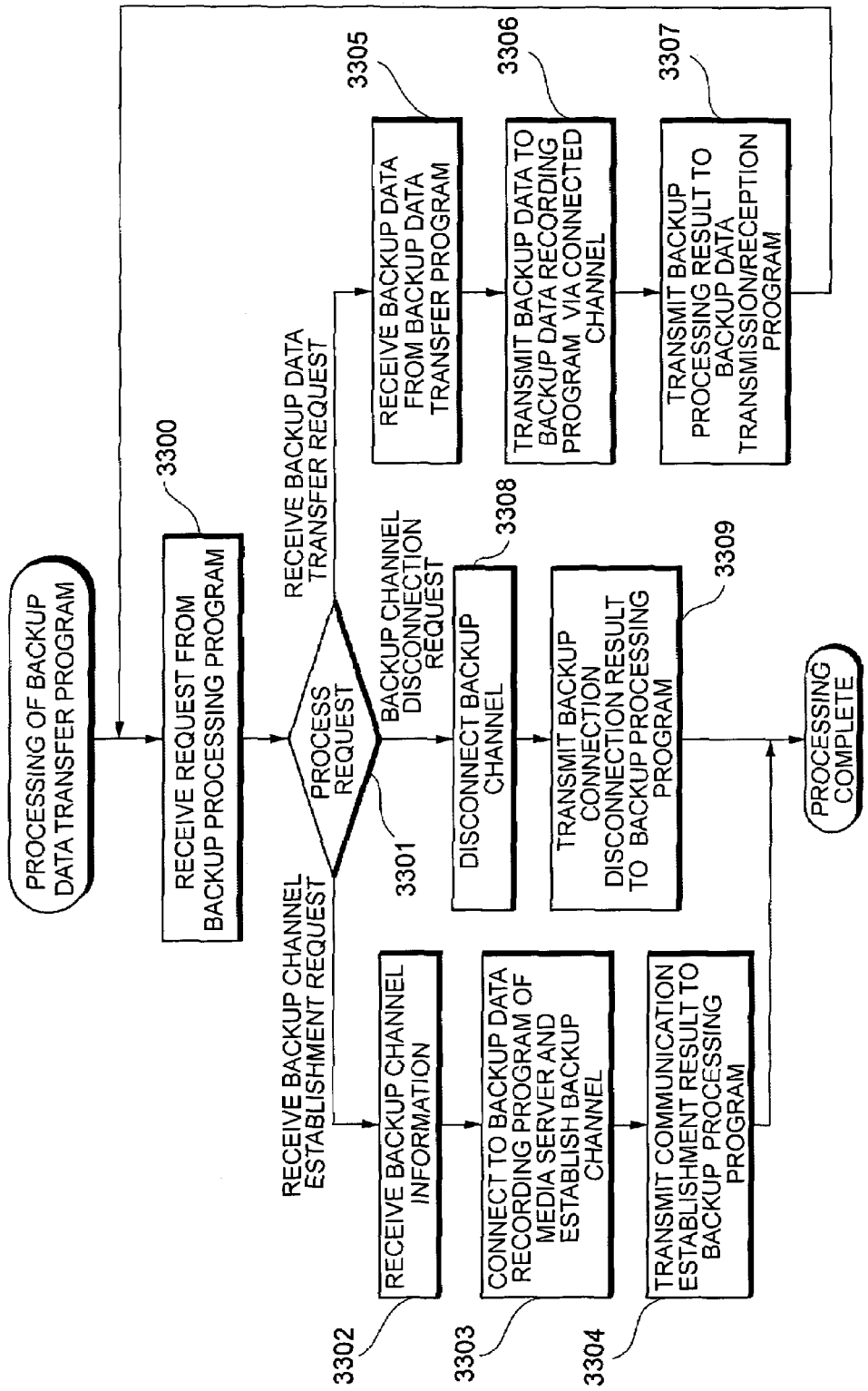
FIG. 13 is a flowchart showing the backup data transfer processing.

FIG. 13 shows an example of the processing performed as a result of the backup data transfer program 1304 in the connection server 1300 being executed.

Foremost, the backup data transfer program 1304 receives a processing request from the backup processing program 1207 in the file sharing server 1200 (step 3300), and determines the content of such processing request (step 3301).

There are three processing requests to be received by the backup data transfer program 1304.

The first processing request is a backup channel establishment request to be sent from the backup processing program 1207 in the file sharing server 1200 to the backup data transfer program 1304. When the backup data transfer program 1304 receives a backup channel establishment request, the backup data transfer program 1304 connects to the backup channel connection point created by the backup data recording program 1406 in the media server 1400.

The second processing request is a backup data transfer request to be sent from the backup data send and receive program 1209 in the file sharing server 1200 to the backup data transfer program 1304. When the backup data transfer program 1304 receives a backup data transfer request, it sends backup data to the media server via the backup channel.

The third processing request is a backup channel disconnection request to be sent from the backup processing program 1207 in the file sharing server 1200 to the backup data transfer program 1304. When the backup data transfer program 1304 receives a backup channel disconnection request, it disconnects the backup channel established between the backup data transfer program 1304 and backup data recording program 1406.

When the backup data transfer program 1304 receives a backup channel establishment request, the backup data transfer program 1304 receives backup channel information from the backup processing program 1207 (step 3302).

Next, the backup data transfer program 1304 acquires the network address and connection point of the media server 1400 of the transfer destination of the backup data from the backup channel information received at step 3302, and establishes the backup channel by connecting to the backup data recording program 1406 in the media server 1400 (step 3303).

Next, the backup data transfer program 1304 sends the report on the result of backup channel establishment to the backup processing program 1207 in the file sharing server 1200 (step 3304).

Meanwhile, when the backup data transfer program 1304 receives a backup data transfer request from the backup data send and receive program 1209 in the file sharing server 1200, the backup data transfer program 1304 receives backup data from the backup data send and receive program 1209 (step 3305).

Next, the backup data transfer program 1304 sends backup data to the backup data recording program 1406 via the backup channel established at foregoing step 3303 (step 3306).

Next, the backup data transfer program 1304 sends the execution result of backup processing to the backup data send and receive program 1210 (step 3307).

Here, the backup data transfer program 1304 returns to step 3300 in order to wait for connection from the backup data send and receive program 1209 in the file sharing server 1200 that has not been backed up with the backup channel established at foregoing step 3303, and executes this processing once again.

Meanwhile, when the backup data transfer program 1304 receives a backup channel disconnection request from the backup processing program 1207 in the file sharing server 1200, the backup data transfer program 1304 disconnects the backup channel (step 3308), and sends the report on the result of the backup channel disconnection to the backup processing program 1207 (step 3309).

Figure 14:
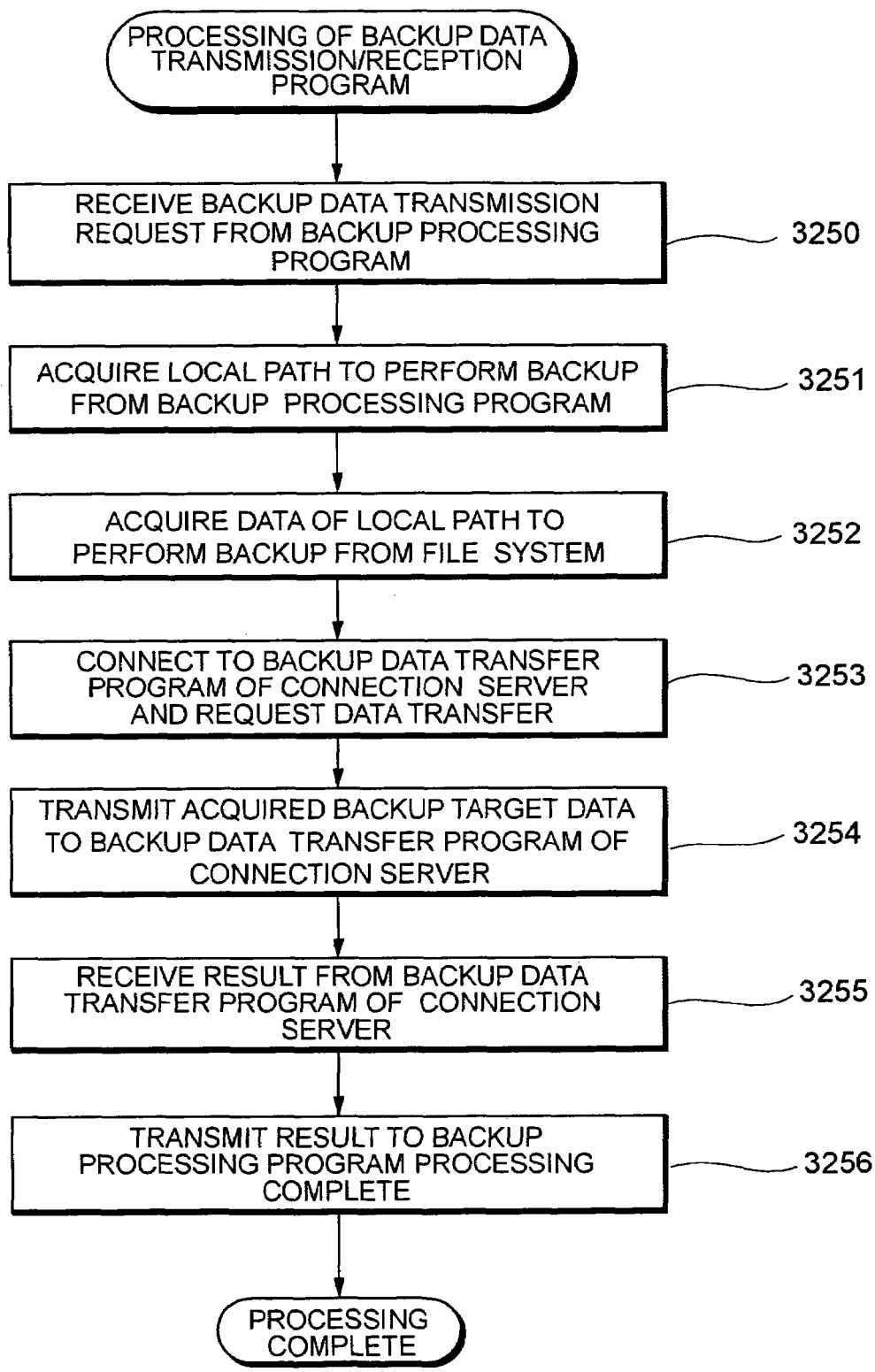
FIG. 14 is a flowchart showing the backup data send and receive processing.

FIG. 14 shows an example of the processing performed as a result of the backup data send and receive program 1209 in the file sharing server 1200 being executed.

Foremost, the backup data send and receive program 1209 receives a backup data transmission request from the backup processing program 1207 (step 3250).

Next, the backup data send and receive program 1209 receives from the backup processing program 1207 a path (local path) of the real files to be backed up and which are managed by the file sharing server 1200 (step 3251).

Next, the backup data transfer program 1209 acquires data of real files from the file systems 1602A, 1602B, 1602C that it is personally managing based on the local path received from the backup processing program 1207 (step 3252).

Next, the backup data send and receive program 1209 connects to the backup data transfer program 1304 in the connection server 1300, and requests the transfer of the backup data (backup data transfer request) (step 3253).

The backup data send and receive program 1209 sends the backup data acquired at step 3252 to the backup data transfer program 1304 in the connection server 1300 (step 3254).

Next, the backup data send and receive program 1209 receives a report on the result of backup from the backup data transfer program 1304 in the connection server 1300 (step 3255), and thereafter sends such report on the result of backup to the backup processing program 1207 in the file sharing server 1200 to which backup was requested (step 3256).

Figure 15:
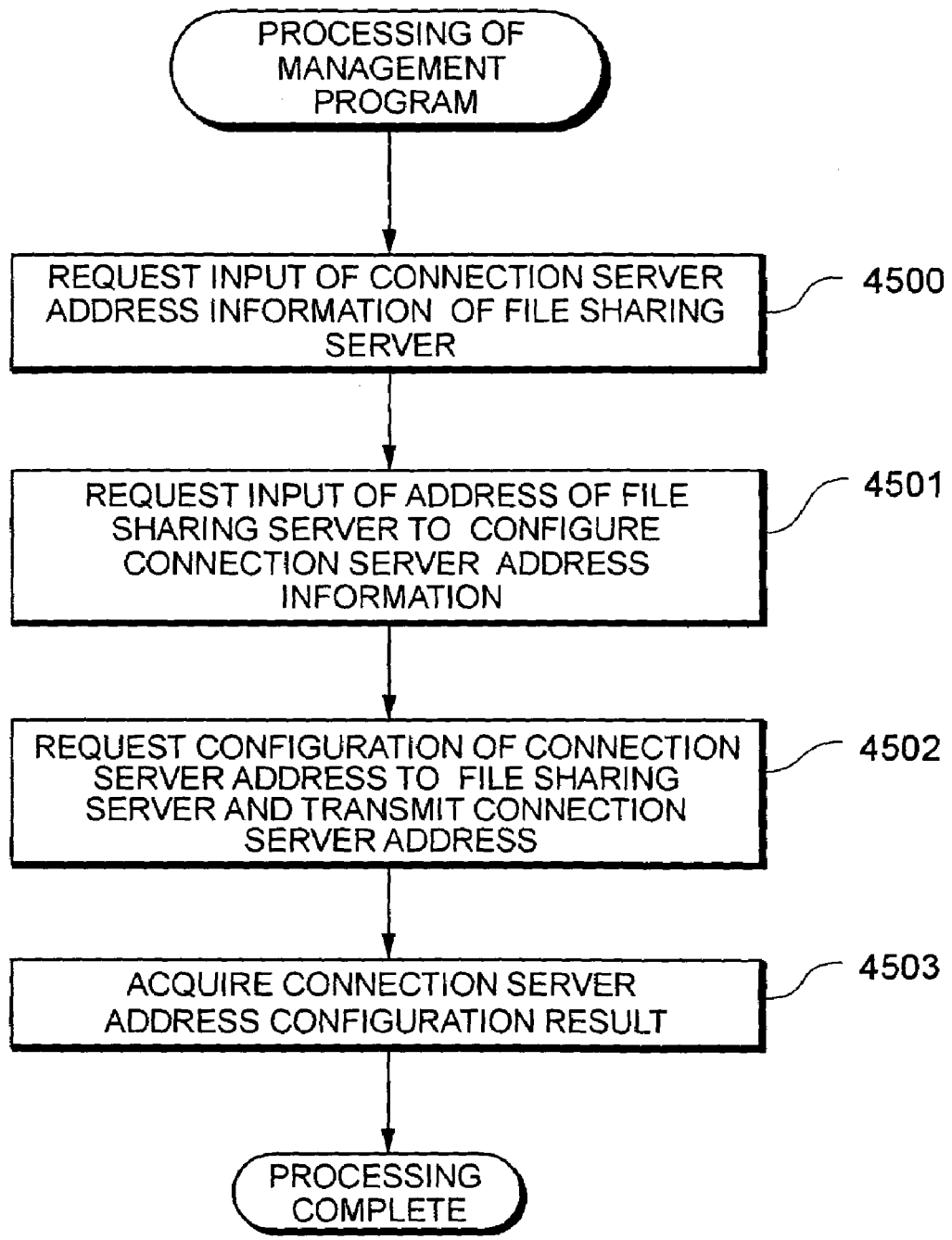
FIG. 15 is a flowchart showing the processing of a management program.

FIG. 15 shows an example of the processing performed as a result of the management program 1704 in the management server 1700 being executed.

When the administrator managing the backup system 3000 is to configure connection server address information 1210 in the file sharing server 1200, the management program 1704 in the management server 1700 requests the connection server address information 1210 (step 4500). The administrator inputs the network address of the connection server 1300 from the input I/F 1705.

Next, the management program 1704 requests the network address of the file sharing server 1200 configuring the network address of the connection server 1300 input at step 4500 (step 4501). The administrator inputs the network address of the file sharing server 1200 from the input I/F 1705.

Next, the management program 1704 issues a connection server address configuration request to the file sharing server configuration program 1211 in the file sharing server 1200 to which the network address was input at step 4501, and sends the network address of the connection server 1300 input at step 4500 to the file sharing server configuration program 1211 (step 4502).

Next, the management program 1704 receives a report on the result of the connection server address configuration request from the file sharing server configuration program 1211 in the file sharing server 1200 to which the connection server address configuration request was issued (step 4503).

Figure 16:
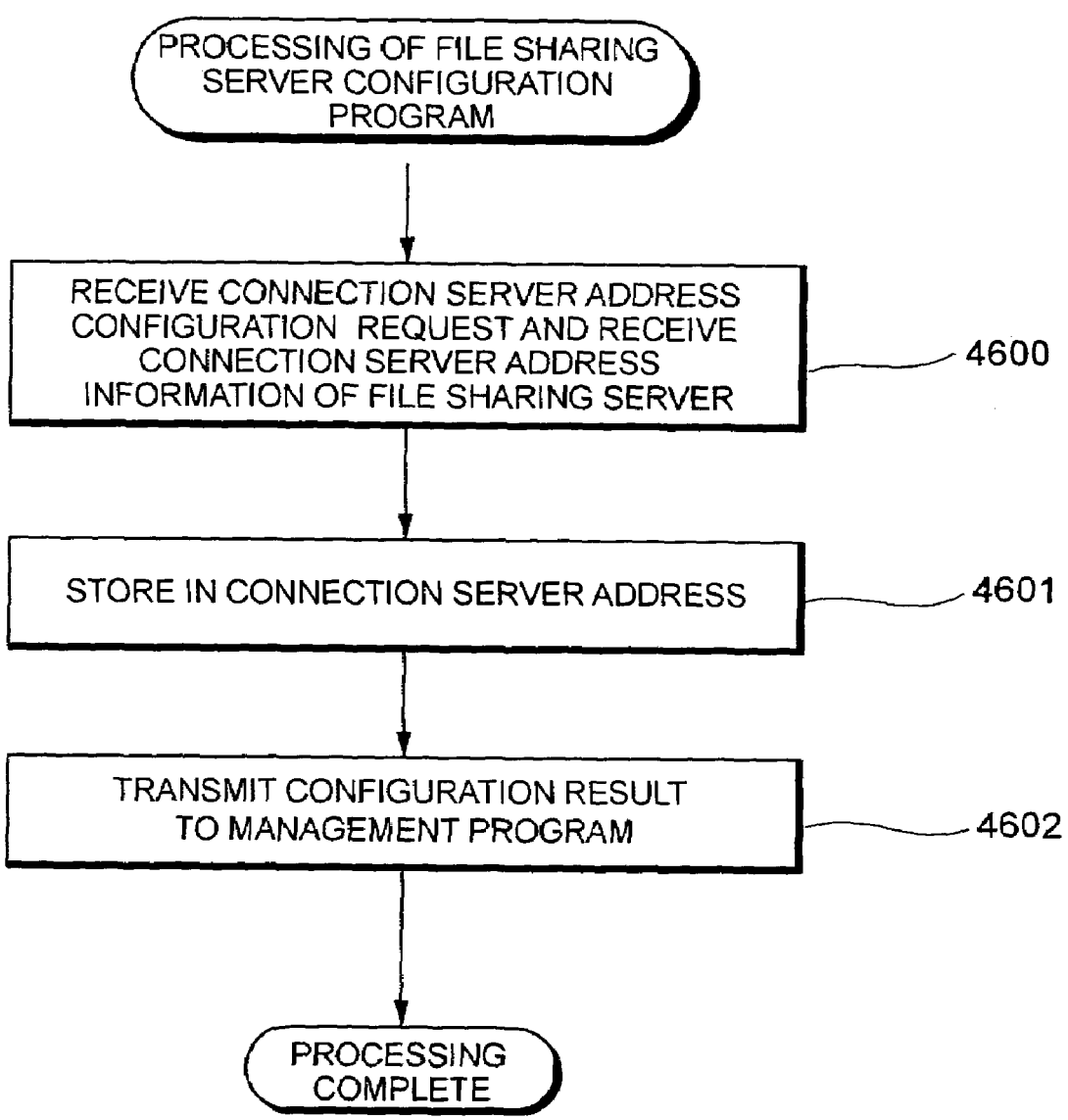
FIG. 16 is a flowchart showing the file sharing server configuration processing.

FIG. 16 shows an example of the processing performed as a result of the file sharing server configuration program 1211 in the file sharing server 1200 being executed.

The file sharing server configuration program 1211 receives a connection server address configuration request from the management program 1704 in the management server 1700, and receives the network address of the connection server 1300 (step 4600).

Next, the file sharing server configuration program 1211 stores the network address of the connection server 1300 received at step 4600 in the connection server address information 1210 in the memory 1205 (step 4601).

Next, the file sharing server configuration program 1211 sends the storage result of the connection server address information 1210 to the management program 1704 (step 4602).

Figure 17:
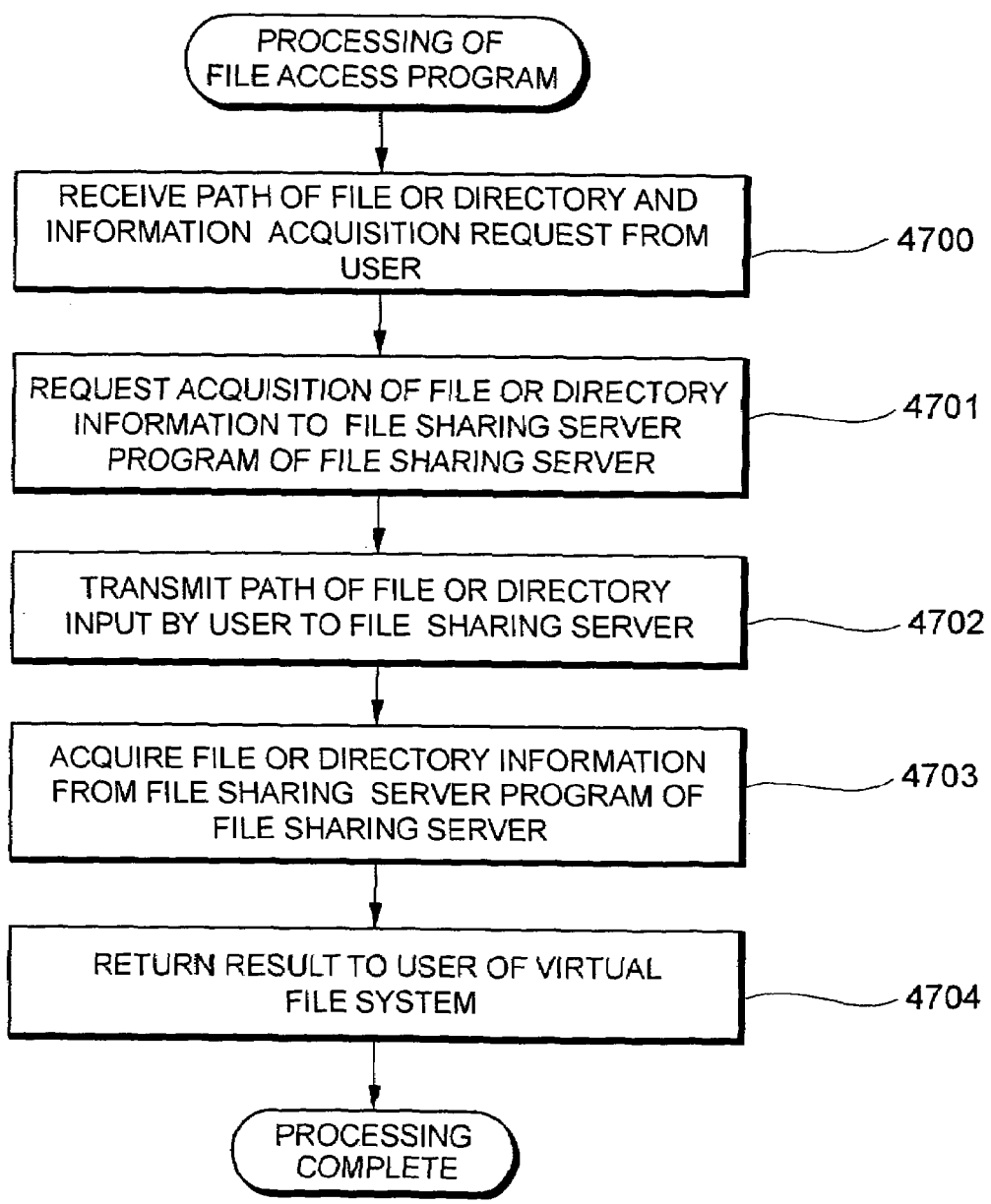
FIG. 17 is a flowchart showing the processing of a file access program.

FIG. 17 shows an example of the processing performed as a result of the file access program 1004 in the client 1000 or backup server 1100 being executed.

The file access program 1004 receives a file path or a directory path from the user using the client 1000, and receives the information acquisition request of such file path or directory path (step 4700).

Next, the file access program 1004 requests the file sharing server program 1208 in the file sharing server 1200 to acquire information on the file or directory (step 4701).

Next, the file access program 1004 sends the file path or directory path input by the user using the client 1000 to the file sharing server program 1208 (step 4702).

Next, the file access program 1004 acquires information on the file or directory from the file sharing server program 1208 (step 4703). Here, information on the file or directory refers to information showing whether a file input by the user exists with respect to files. Regarding directories, this would be path information of files belonging to the directory.

For example, when the file sharing server program 1208 determines that a file input by the user does not exist, the file access program 1004 replies to the user to the effect that a file could not be found. When a file input by the user exists and it was possible to acquire information regarding the file from the file sharing server program 1208, the file access program 1004 returns information concerning such file to the user. When the file sharing server program 1208 determines that a directory input by the user does not exist, the file access program 1004 replies to the user to the effect that a directory could not be found. When a directory input by the user exists, the file sharing server program 1208 sends information concerning all files belonging to such directory to the file access program 1004, and the file access program 1004 returns such information to the user (step 4704).

Figure 18:
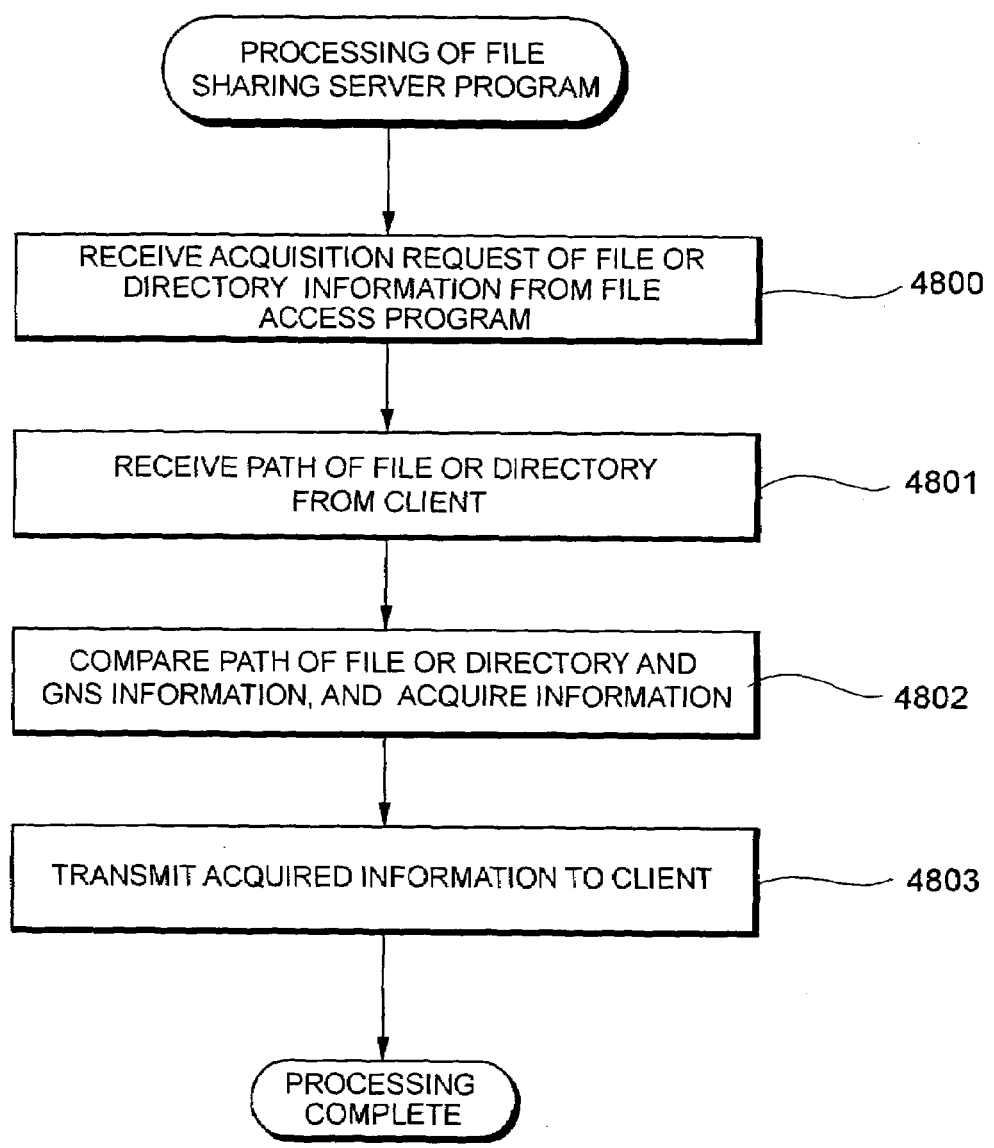
FIG. 18 is a flowchart showing the processing of a file sharing server.

FIG. 18 shows an example of the processing performed as a result of the file sharing server program 1208 in the file sharing server 1200 being executed.

The file sharing server program 1208 receives an acquisition request of file information or directory information from the file access program 1004 in the client 1000 or backup server 1100 (step 4800), and then receives the file path or directory path from the file access program 1004 (step 4801).

Next, the file sharing server program 1208 compares the file path or directory path acquired at step 4801 with the GNS path of the GNS information 1604, and acquires information on the file or directory (step 4802). Here, information on the file or directory refers to information showing whether a file input by the user exists with respect to files. Regarding directories, this would be path information of files belonging to the directory.

Next, the file sharing server program 1208 sends the information on the file or directory acquired at step 4802 to the file access program 1004 in the client 1000 or backup server 1100 (step 4803).

According to the present embodiment, when backing up the virtual file system 2000 configured with a Global Name Space, since it is possible to backup up all file sharing servers 1200 with a single backup request to the virtual file system 2000 without having to request backup to each of the plurality of file sharing servers 1200 configuring the virtual file system 2000, the processing load of the administrator managing the backup and administrative costs can be reduced significantly.

As backup processing in the virtual file system 2000, conventionally, the file sharing server 1200 requested a file access from the client 1000 acquired files from the file sharing server 1200 actually managing files, and returned the data thereof to the client 1000. With this method, since data would once go through unnecessary file sharing servers 1200, this resulted in considerable overhead and was inefficient.

According to the method of this embodiment, since backup can be performed without having to go through unnecessary file sharing servers 1200, the process is efficient.

Further, with a virtual file system 2000 configured from a plurality of file sharing servers 1200, there is a function (file system migration function) of reducing the bias of the load of all file sharing servers 1200 configuring the virtual file system 2000 by migrating the file systems 1602A, 1602B, 1602C managed by the respective file sharing servers 1200 to another file sharing server among the plurality of file sharing servers 1200 configuring the virtual file system 2000.

With the file system migration function, since the relationship of the respective file sharing servers 1200 and the respective file systems 1602A, 1602B, 1602C is managed, it is necessary to update the GNS information 1604. Conventionally, if the file systems 1602A, 1602B, 1602C managed respectively by the file sharing servers 1200 configuring the virtual file system 2000 is migrated, depending on the timing of such migration, even if the backup server 1100 requests backup, the backup of file systems 1602A, 1602B, 1602C not managed by the file sharing server 1200 will be requested, and there were cases where such backup would end in a failure.

Nevertheless, according to the present embodiment, upon backing up the virtual file system 2000, since the backup execution program 1109 issues a backup request to the specific file sharing server 1200, and the backup processing program 1207 in such specific file sharing server 1200 refers to the GNS information 1604 and sends a backup request to the respective file sharing servers 1200 managing the real files to be backed up, the backup will not end in a failure.

Second Embodiment

Figure 19:
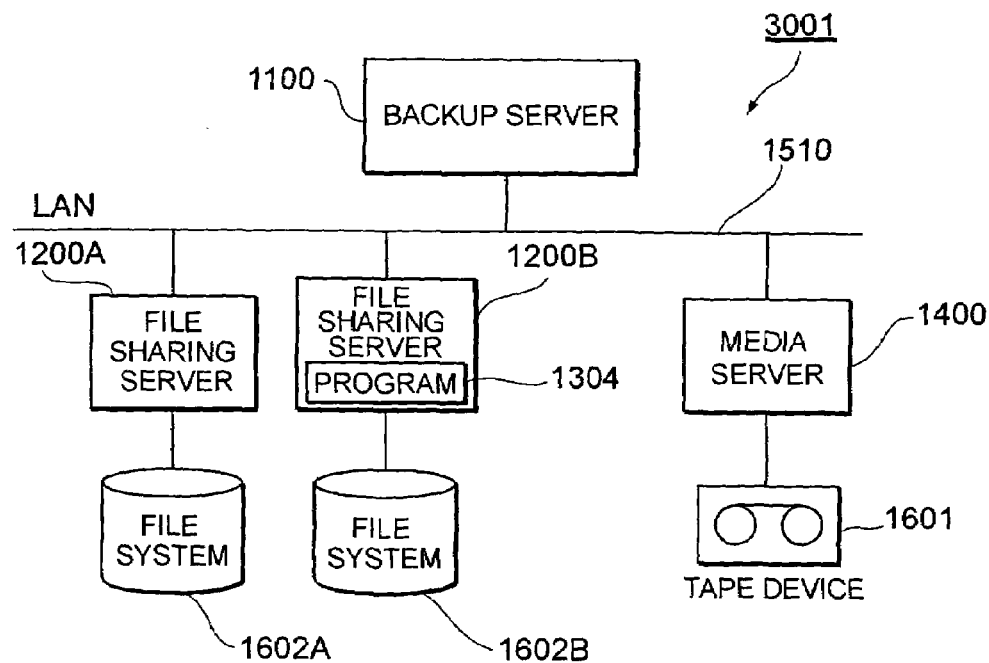
FIG. 19 is a system configuration of the backup system pertaining to the second embodiment.

FIG. 19 shows a system configuration of a backup system 3001 pertaining to the second embodiment of the present invention. In the second embodiment, the file sharing servers 1200B among the plurality of file sharing servers 1200A, 1200B configuring the virtual file system has the backup data transfer program 1304, and the file sharing server 1200B functions as the connection server 1300. Thus, in the second embodiment, the connection server 1300 illustrated in the first embodiment does not exist.

The backup channel established between the connection server 1300 and media server 1400 in the first embodiment is established between the file sharing server 1200B and media server 1400 in the second embodiment. Thus, the backup channel connection request from the file sharing server 1200A is sent to the file sharing server 1200B. Further, although the address information of the connection server 1300 was input by the administrator to the management program 1704 in the management server 1700 in the first embodiment, the network address of the file sharing server 1200B is input in the second embodiment.

In the second embodiment, the file backup channel establishment request transferred by the backup processing program 1207 in the sharing server 1200A is transferred to the backup data transfer program 1304 in the file sharing server 1200B. The backup data transfer program 1304 in the file sharing server 1200B establishes the backup channel between the file sharing server 1200B and media server 1400 based on the backup establishment request received from the backup processing program 1207 in the file sharing server 1200A.

Further, in the second embodiment, the backup data from all file sharing servers 1200A, 1200B configuring the virtual file system is sent to the backup data transfer program 1304 in the file sharing server 1200B.

Third Embodiment

Figure 20:
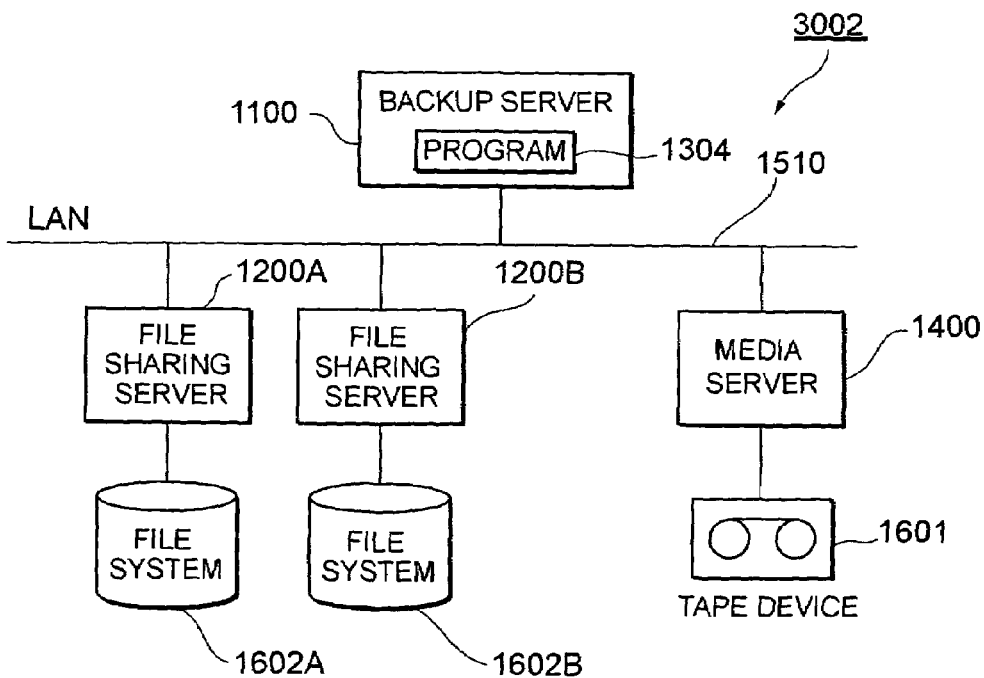
FIG. 20 is a system configuration of the backup system pertaining to the third embodiment.

FIG. 20 shows a system configuration of a backup system 3002 pertaining to the third embodiment of the present invention. In the third embodiment, the backup server 1100 has the backup data transfer program 1304, and the backup server 1100 functions as the connection server 1300. Thus, in the third embodiment, the connection server 1300 illustrated in the first embodiment does not exist.

The backup channel established between the connection server 1300 and media server 1400 in the first embodiment is established between the backup server 1100 and media server 1400 in the third embodiment. Thus, the backup channel connection request from the file sharing server 1200A, 1200B is sent to the backup server 1100. Further, although the address information of the connection server 1300 was input by the administrator to the management program 1704 in the management server 1700 in the first embodiment, the network address of the backup server 1100 is input in the third embodiment.

In the third embodiment, the backup channel establishment request transferred by the backup processing program 1207 in the file sharing server 1200 is transferred to the backup data transfer program 1304 in the backup server 1100. The backup data transfer program 1304 in the backup server 1100 establishes the backup channel between the backup server 1100 and media server 1400 based on the backup establishment request received from the backup processing program 1207 in the file sharing servers 1200A, 1200B.

Further, in the third embodiment, the backup data from all file sharing servers 1200A, 1200B configuring the virtual file system is sent to the backup data transfer program 1304 in the backup server 1100.

Fourth Embodiment

Figure 21:
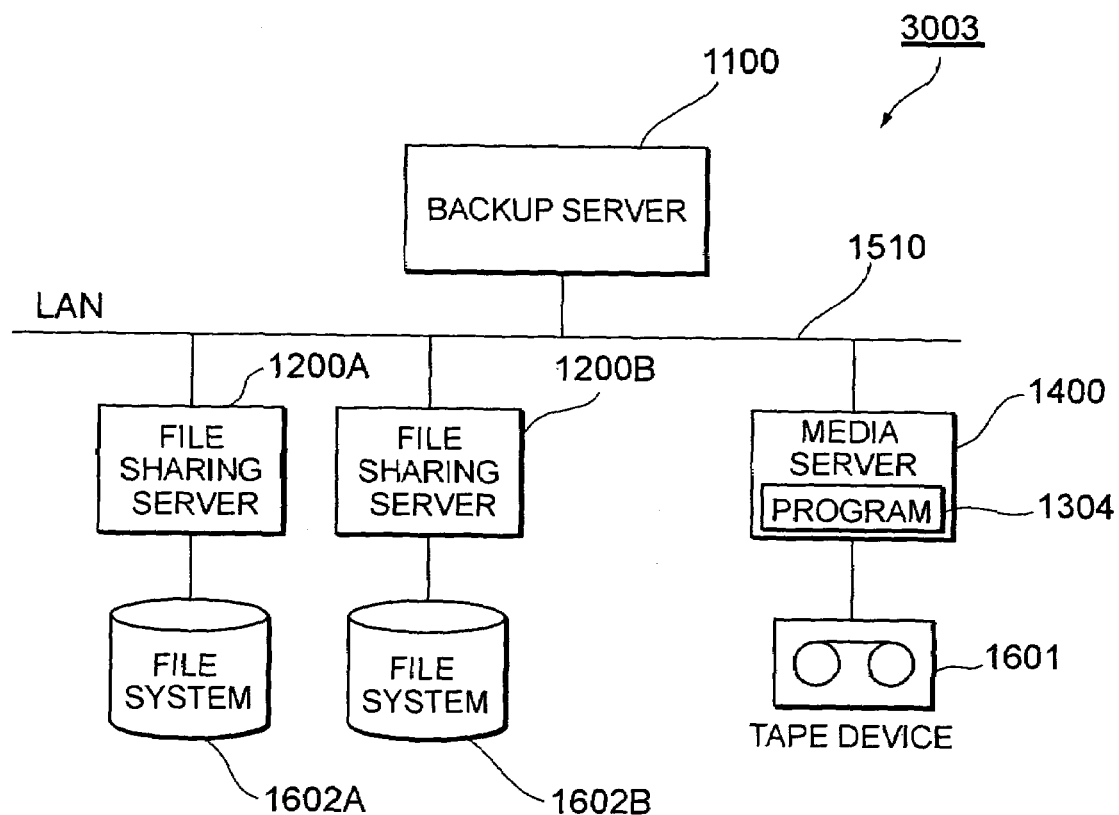
FIG. 21 is a system configuration of the backup system pertaining to the fourth embodiment.

FIG. 21 shows a system configuration of a backup system 3003 pertaining to the fourth embodiment of the present invention. In the fourth embodiment, the media server 1400 has the backup data transfer program 1304, and the media server 1400 functions as the connection server 1300. Thus, in the fourth embodiment, the connection server 1300 illustrated in the first embodiment does not exist.

The backup channel established between the connection server 1300 and media server 1400 in the first embodiment is established between the backup data transfer program 1304 in the media server 1400 and the backup data recording program 1406 in the media server 1400 in the fourth embodiment. Thus, a backup channel connection request from the file sharing servers 1200A, 200B is sent to the media server 1400. Further, although the address information of the connection server 1300 was input by the administrator to the management program 1704 in the management server 1700 in the first embodiment, the network address of the media server 1400 is input in the fourth embodiment.

In the fourth embodiment, the backup channel establishment request transferred by the backup processing program 1207 in the file sharing servers 1200A, 1200B is transferred to the backup data transfer program 1304 in the media server 1400. The backup data transfer program 1304 in the media server 1400 establishes the backup channel between the backup data transfer program 1304 in the media server 1400 and the backup data recording program 1406 in the media server 1400 based on the backup establishment request received from the backup processing program 1207 in the file sharing servers 1200A, 1200B.

Further, in the fourth embodiment, the backup data from all file sharing servers 1200A, 1200B configuring the virtual file system is sent to the backup data transfer program 1304 in the media server 1400.

What is claimed is:

1. A backup system, comprising:

a virtual file system configured from a plurality of file server computers for providing a file sharing service to a client via a Global Name Space (GNS) integrating local name spaces of file systems respectively managed by the plurality of file server computers;

a backup server computer for managing the backup of said virtual file system;

a media server computer for storing backup data of said virtual file system in an external storage; and a connection server computer which is connected to each of said plurality of file server computers for establishing with said media server computer a backup channel via which a backup is performed in a communication procedure based on a Network Data Management Protocol (NDMP), wherein each of said plurality of file server computers acquires GNS information, with respect to each of the plurality of files managed by said virtual file system, including a global path of said each file, information for specifying a file server computer managing said each file, and a local path of said each file, when a file server computer among the plurality of file server computers configuring said virtual file system receives from said backup server computer a backup request designating files to be backed up with a global path, the file server computer that received said backup request searches, based on the global path designated by the backup request and said GNS information, for a file server computer managing files to be backed up among said plurality of file server computers, if the file server computer that received said backup request is the file server computer that had been searched for, the file server computer sends the files to be backed up to said connection server computer based on the local path of the files to be backed up, if another file server computer is the file server computer that had been searched for, the file server computer that received said backup request issues a backup request of the files to be backed up together with the local path to said another file server, said another file server computer then sends the files to be backed up to said connection server computer based on the local path of the files to be backed up, and said connection server computer then transfers data of said files to be backed up to said media server computer using a communication means based on the NDMP, said file server computer that received a backup request from said backup server computer requests the establishment of said backup channel to said connection server, said file server computer retains connection server computer address information showing a network address of said connection server, connects to said connection server computer based on said connection server computer address information, and requests the establishment of said backup channel to said media server, each of said local name spaces is known within a corresponding one of the file server computers and remains unknown to the client and to the backup server, and the connection server computer receives backup data from the file server computer managing the files to be backed, without disconnecting said backup channel with said media server.

2. The backup system according to claim 1, wherein
when any file server computer among the plurality of file server computers configuring said virtual file system receives a restoration request from said backup server, the file server computer that received said restoration request searches for a file server computer managing files of a restoration target among said plurality of file server computers, and transfers said restoration request to the searched file server;
and wherein the file server computer that received the transfer of said restoration request transfers said restoration data to said media server computer via said connection server.

3. A file server computer configuring a virtual file system configured from a plurality of file server computers for receiving a file access from a client via a Global Name Space (GNS) integrating local name spaces of file systems respectively managed by the plurality of file server computers connected via a network, comprising:
a network interface connected to said network;
a processor connected to said network interface; and
a memory connected to said processor, wherein,
said processor acquires GNS information, with respect to each of the plurality of files managed by said virtual file system, including a global path of said each file, information for specifying a file server computer managing said each file, and a local path of said each file,
when said processor receives a backup request designating files to be backed up with a global path from a backup server computer managing the backup of said virtual file system, said processor searches, based on the global path designated by the backup request and said GNS information, for a file server computer managing the files to be backed up among said plurality of file server computers, and transfers said backup request to the searched file server,
if the file server computer that received said backup request is the file server computer that had been searched for, said processor sends the files to be backed up by the file server computer to a media server computer via a connection server computer which is connected to each of said plurality of file server computers for establishing with said media server computer a backup channel via which a backup is performed in a communication procedure based on a Network Data Management Protocol (NDMP) thereby storing backup data of said virtual file system in an external storage, and
if another file server computer is the file server computer that had been searched for, said processor issues a backup request of the files to be backed up together with the local path to said another file server computer to make said another file server computer send the files to be backed up to said connection server computer based on the local path of the files to be backed up, and to make the connection server computer transfer data of said files to be backed up to said media server computer using a communication means based on the NDMP,
each of said local name spaces is known within a corresponding one of the file server computers and remains unknown to the client and to the backup server,
the connection server computer receives backup data from the file server computer managing the files to be backed, without disconnecting said backup channel with said media server, and
after receiving from said processor the backup request of the files to be backed up together with the local oath. said another file server computer sends the files to be backed up to said connection server computer based on the local oath of the files to be backed up, and the connection server computer transfers data of said files to be backed up to said media server computer using a communication means based on the NDMP.

4. The file server computer according to claim 3, wherein said memory stores connection server computer address information showing a network address of said connection server; and
said processor connects to said connection server computer based on said connection server computer address information, and requests the establishment of said backup channel to said media server.

5. A backup method, comprising the steps of:
configuring a virtual file system from a plurality of file server computers;
by a processor in a file server computer of the virtual file system, receiving a file access from a client via a Global Name Space (GNS) integrating local name spaces of file systems respectively managed by the plurality of file server computers network connected via a network, and receiving a backup request from a backup server computer managing the backup of said virtual file system;
acquiring by a processor in each of said plurality of file server computers GNS information, with respect to each of the plurality of files managed by said virtual file system, including a global path of said each file, information for specifying a file server computer managing said each file, and a local path of said each file;
by the processor in the file server computer that received from said backup server computer said backup request designating files to be backed up with a global path, searching, based on the global path designated by the backup request and said GNS information, for a file server computer managing files to be backed up among said plurality of file server computers;
if the file server computer that received said backup request is the file server computer that had been searched for, by the processor therein, sending the files to be backed up by the file server computer to a media server computer via a connection server computer which is connected to each of said plurality of file server computers for establishing with said media server computer a backup channel via which a backup is performed in a communication procedure based on a Network Data Management Protocol (NDMP) thereby storing backup data of said virtual file system in an external storage; and
if another file server computer is the file server computer that had been searched for, issuing by the processor in the file server computer that received said backup request a backup request of the files to be backed up together with the local path to said another file server, then sending by another processor in said another file server computer the files to be backed up to said connection server computer based on the local path of the files to be backed up, and then transferring by a processor in said connection server computer data of said files to be backed up to said media server computer using a communication means based on the NDMP,
wherein each of said local name spaces is known within a corresponding one of the file server computers and remains unknown to the client and to the backup server, and
the processor in the connection server computer receives backup data from the processor in the file server computer managing the files to be backed, without disconnecting said backup channel with said media server.

* * * * *